(12) United States Patent
Wynne et al.

(10) Patent No.: US 11,338,511 B2
(45) Date of Patent: *May 24, 2022

(54) MULTIPLE IMAGE PROJECTION METHOD FOR ADDITIVE MANUFACTURING

(71) Applicant: Intrepid Automation, San Diego, CA (US)

(72) Inventors: Ben Wynne, Escondido, CA (US); Jamie Lynn Etcheson, San Diego, CA (US); Christopher Sean Tanner, Idyllwild, CA (US); Robert Lee Mueller, San Diego, CA (US); Ivan Dejesus Chousal, Chula Vista, CA (US)

(73) Assignee: Intrepid Automation, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/301,204

(22) Filed: Mar. 29, 2021

(65) Prior Publication Data

US 2021/0268724 A1 Sep. 2, 2021

Related U.S. Application Data

(63) Continuation of application No. 16/938,298, filed on Jul. 24, 2020, now Pat. No. 11,014,301, which is a
(Continued)

(51) Int. Cl.
*B29C 64/129* (2017.01)
*B29C 64/268* (2017.01)
(Continued)

(52) U.S. Cl.
CPC .......... *B29C 64/268* (2017.08); *B29C 64/129* (2017.08); *B29C 64/135* (2017.08);
(Continued)

(58) Field of Classification Search
CPC ........ B29C 64/286; B33Y 30/00; B33Y 50/00
(Continued)

(56) References Cited

U.S. PATENT DOCUMENTS

| 7,318,718 B2 | 1/2008 | Ueno |
| 8,142,026 B2 | 3/2012 | Aufranc et al. |

(Continued)

FOREIGN PATENT DOCUMENTS

| CN | 104015363 A | 9/2014 |
| CN | 104015363 B | 8/2016 |

(Continued)

OTHER PUBLICATIONS

International Search Report dated Nov. 8, 2019 for PCT Patent Application No. PCT/US19/43305.
(Continued)

*Primary Examiner* — Jeffrey M Wollschlager
*Assistant Examiner* — Xue H Liu
(74) *Attorney, Agent, or Firm* — MLO, a professional corp.

(57) ABSTRACT

An additive manufacturing system, and associated methods, comprise an image projection system comprising a plurality of image projectors that project a composite image onto a build area within a resin pool. The composite image comprises a plurality of sub-images arranged in an array. The properties of each sub-image and the alignment of the position of each sub image within the composite image can be adjusted using a stack of filters comprising: 1) an irradiance mask that normalizes irradiance, 2) a gamma adjustment mask that adjusts sub-image energy based on a reactivity of the resin, 3) a warp correction filter that provides geometric correction, and 4) an edge blending bar at one or more sub-image edges.

15 Claims, 27 Drawing Sheets

Related U.S. Application Data continuation of application No. 16/370,337, filed on Mar. 29, 2019, now Pat. No. 10,780,640.

(60) Provisional application No. 62/734,003, filed on Sep. 20, 2018, provisional application No. 62/711,719, filed on Jul. 30, 2018.

(51) Int. Cl.
*B33Y 30/00* (2015.01)
*B33Y 10/00* (2015.01)
*B29C 64/135* (2017.01)
*B29C 64/291* (2017.01)

(52) U.S. Cl.
CPC ............ *B29C 64/291* (2017.08); *B33Y 10/00* (2014.12); *B33Y 30/00* (2014.12)

(58) Field of Classification Search
USPC ........................................................ 264/401
See application file for complete search history.

(56) References Cited

U.S. PATENT DOCUMENTS

| | | |
|---|---|---|
| 9,453,142 B2 | 9/2016 | Rolland et al. |
| 9,914,266 B2 | 3/2018 | Ueda et al. |
| 9,930,307 B1 | 3/2018 | Kursula et al. |
| 2008/0169586 A1 | 7/2008 | Hull et al. |
| 2015/0137426 A1 | 5/2015 | Esbroeck et al. |
| 2015/0202805 A1 | 7/2015 | Saruhashi et al. |
| 2016/0121547 A1 | 5/2016 | Kobayashi |
| 2016/0368221 A1 | 12/2016 | Ueda et al. |
| 2017/0102679 A1 | 4/2017 | Greene et al. |
| 2017/0283766 A1 | 10/2017 | Hribar et al. |
| 2017/0318186 A1 | 11/2017 | Morovic et al. |
| 2018/0139426 A1 | 5/2018 | Ueda |

FOREIGN PATENT DOCUMENTS

| | | |
|---|---|---|
| WO | 2016179661 A1 | 11/2016 |
| WO | 2017165832 A1 | 9/2017 |
| WO | 2017210298 A1 | 12/2017 |

OTHER PUBLICATIONS

Notice of Allowance dated Jan. 15, 2021 for U.S. Appl. No. 16/938,298.
Notice of Allowance dated Jun. 29, 2020 for U.S. Appl. No. 16/370,337.
Office Action dated Jun. 1, 2020 for U.S. Appl. No. 16/370,337.
Office Action dated Oct. 6, 2020 for U.S. Appl. No. 16/938,298.
Extended European Search Report dated Mar. 3, 2022 for European Patent Application No. 19843981.2.

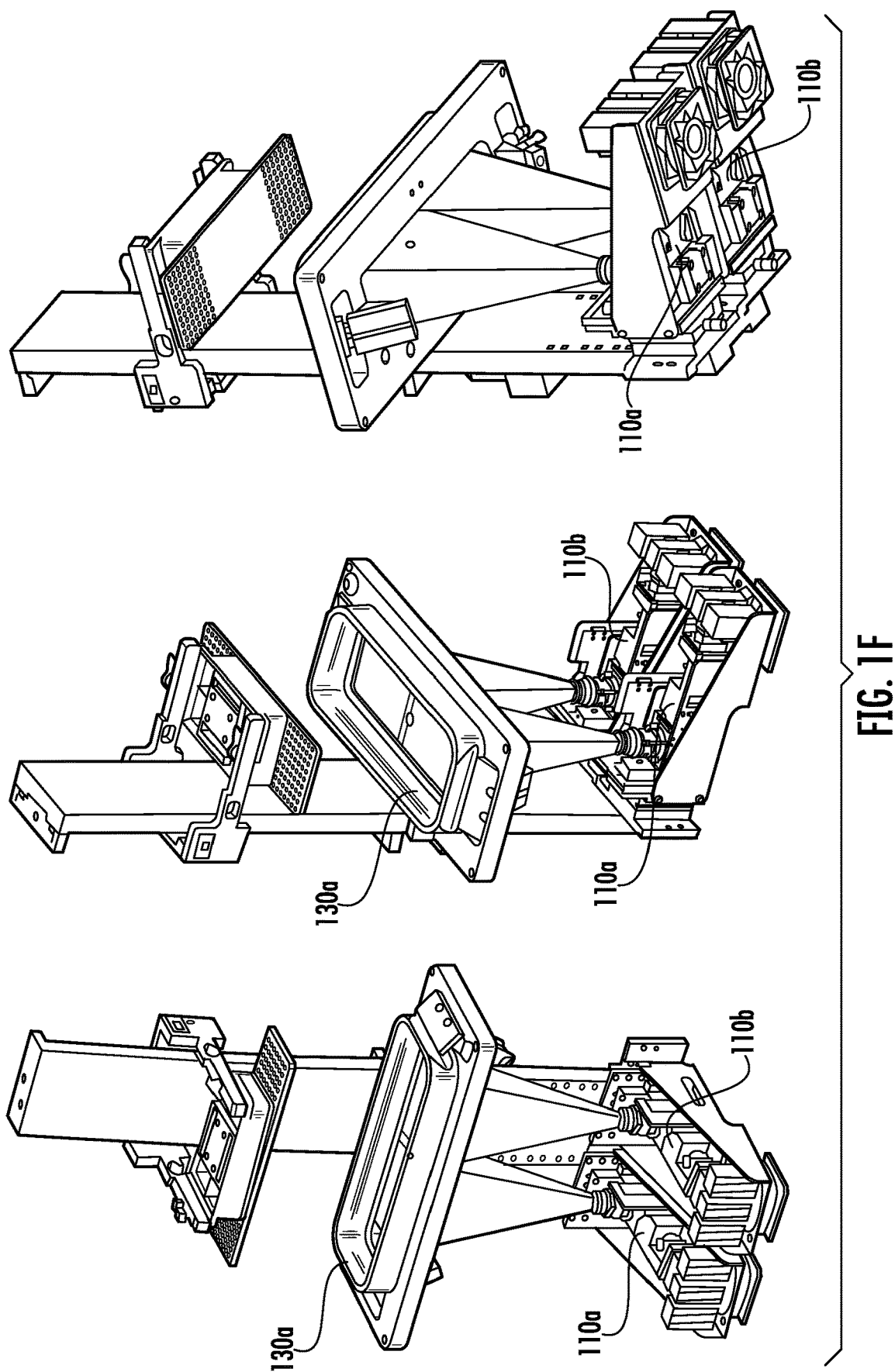

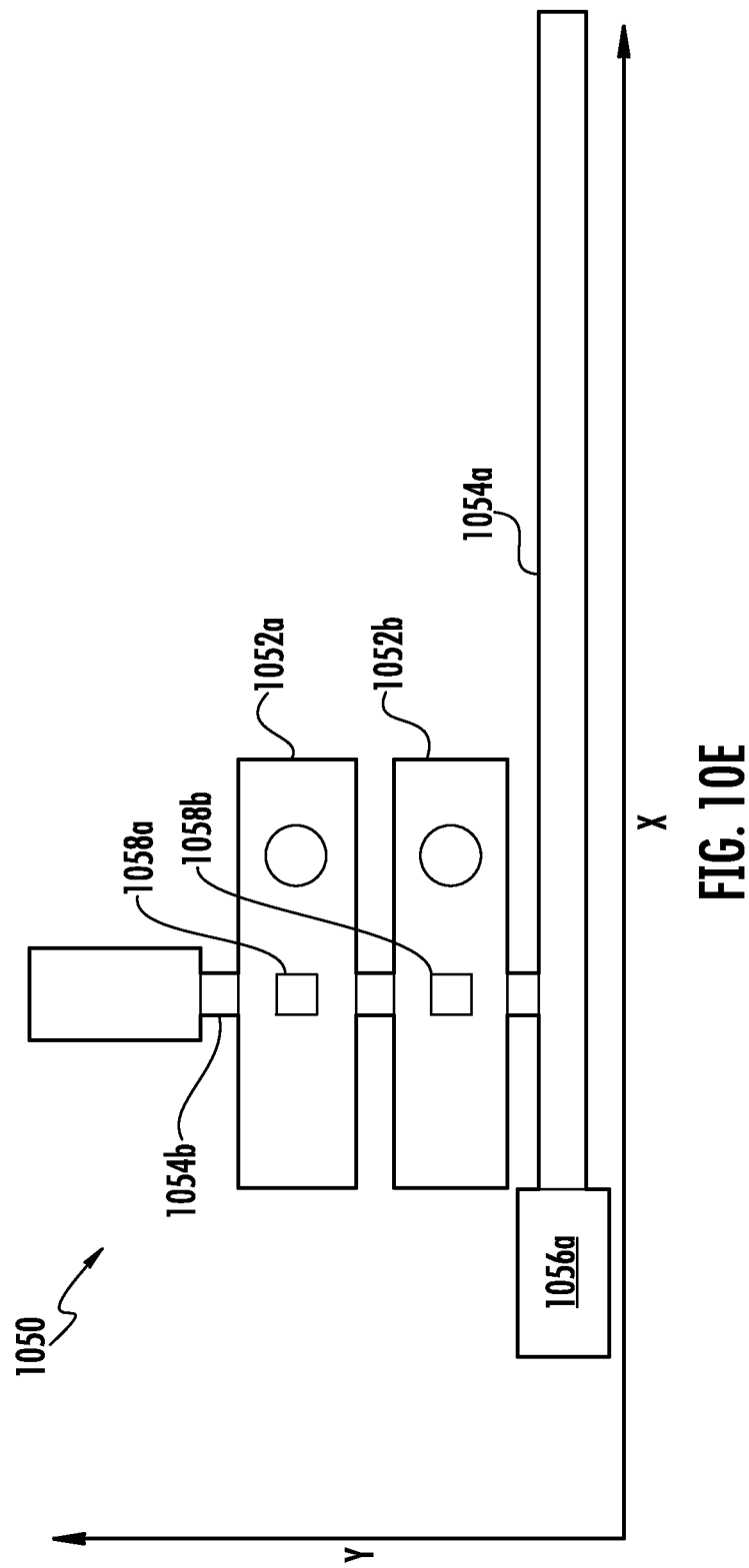

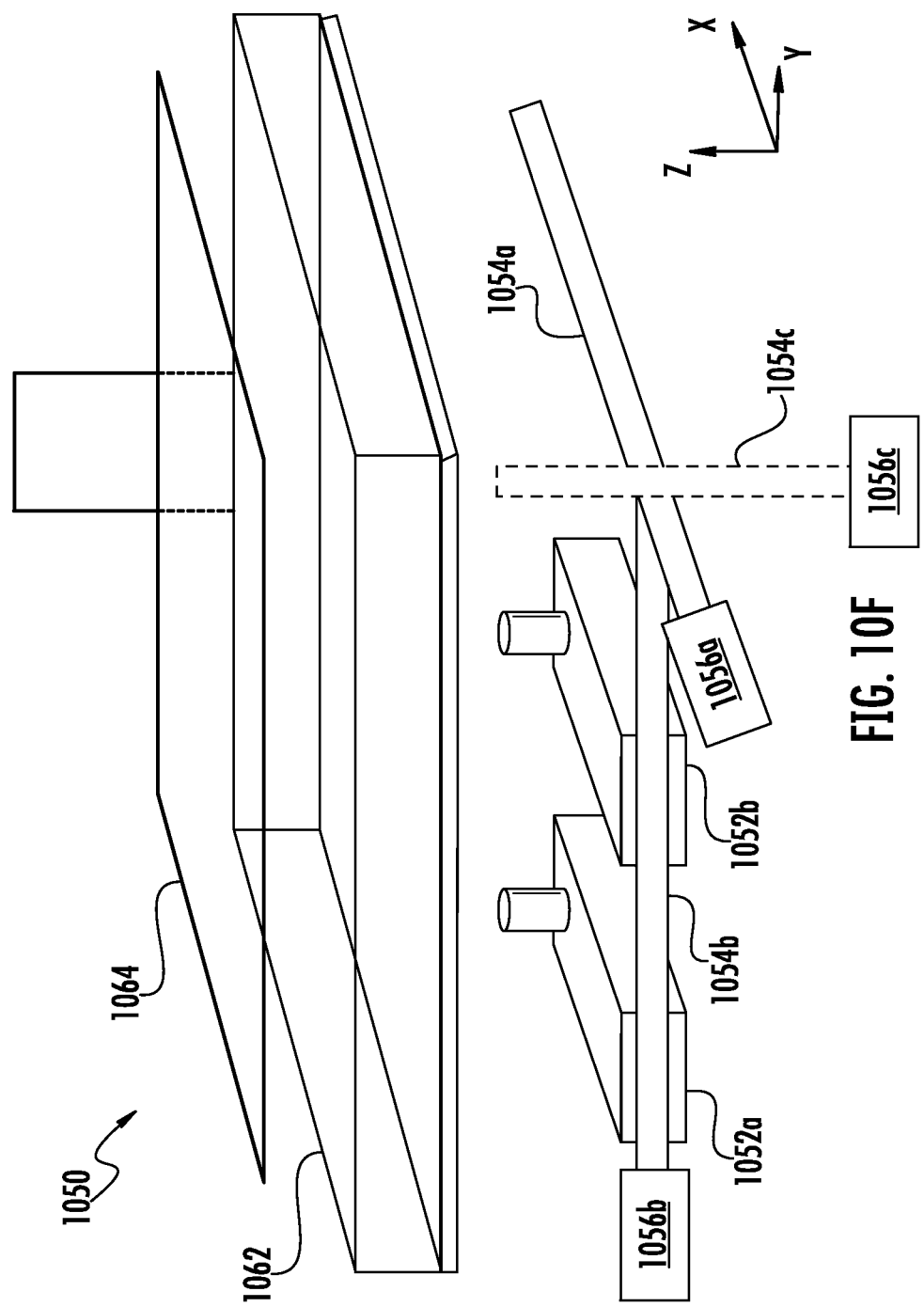

MULTIPLE IMAGE PROJECTION METHOD FOR ADDITIVE MANUFACTURING

RELATED APPLICATIONS

This application is a continuation of U.S. patent spplication Ser. No. 16/938,298, filed Jul. 24, 2020, which is a continuation of U.S. patent application Ser. No. 16/370,337, filed Mar. 29, 2019, which claims priority to U.S. Provisional Patent Application No. 62/711,719, filed on Jul. 30, 2018, and entitled "Multiple Image Projection System for Additive Manufacturing"; and U.S. Provisional Patent Application No. 62/734,003, filed on Sep. 20, 2018, and entitled "Multiple Image Projection System for Additive Manufacturing"; which are hereby incorporated by reference for all purposes.

BACKGROUND

Stereolithography (SLA) 3D printing classically employed a point laser or lasers that were moved around a 2D plane to rasterize the outline and fill of a layer. Instead of SLA, conventional systems typically use digital light processing (DLP) or alike imaging in order to expose an entire layer at once with improved speed. However, one problem that arises with conventional additive manufacturing systems utilizing DLP is that as the layer size increases, the pixel size increases proportionally. The result is a decrease in the resolution of the final part, which will negatively affect part accuracy and surface finish. This also has the negative affect of reducing the projected energy density, which slows down the print process further as each layer needs a longer exposure time. Therefore, as DLP system are used for larger layer sizes, the theoretical advantage that full layer exposing achieves over conventional methods is reduced.

SUMMARY

In some embodiments, an additive manufacturing system comprises an image projection system comprising a plurality of image projectors that project a composite image onto a build area within a resin pool, wherein each of the image projectors projects a sub-image onto a portion of the build area, and the composite image comprises a plurality of sub-images arranged in an array. The additive manufacturing systems also includes a display subsystem that can control the image projection system and each of the image projectors to adjust the properties of each sub-image and the alignment of the position of each sub-image within the composite image. Two or more adjacent sub-images in the array also can overlap at two or more sub-image edges. The properties of each sub-image can be adjusted using a stack of filters comprising: 1) an irradiance mask that normalizes irradiance, 2) a gamma adjustment mask that adjusts sub-image energy based on a reactivity of the resin, 3) a warp correction filter that provides geometric correction, and 4) an edge blending bar at one or more sub-image edges.

In some embodiments, a method comprises providing an additive manufacturing system comprising an image projection system and an image display subsystem, wherein the image projection system has a plurality of image projectors. The method can also comprise projecting a composite image onto a build area within a resin pool using the image projection system, wherein the image projection system is controlled by the image display subsystem. The composite image comprises a plurality of sub-images arranged in an array, two or more adjacent sub-images in the array overlap at two or more sub-image edges, and each sub-image is projected onto a portion of the build area using one of the plurality of image projectors. The method can also comprise adjusting the properties of each sub-image and aligning the position of each sub-image within the composite image using a set of filters comprising: 1) an irradiance mask that normalizes irradiance, 2) a gamma adjustment mask that adjusts sub-image energy based on a reactivity of the resin, 3) a warp correction filter that provides geometric correction, and 4) an edge blending bar at one or more sub-image edges.

BRIEF DESCRIPTION OF FIGURES

FIG. 1F shows three simplified schematics in perspective views of a PRPS with two image projection systems, in accordance with some embodiments.

FIG. 10E is a simplified schematic in side view of a PRPS with moving light sources, in accordance with some embodiments.

FIG. 10F is a simplified schematic in perspective view of a PRPS with moving light sources, in accordance with some embodiments.

DEFINITIONS

Figure 1A:
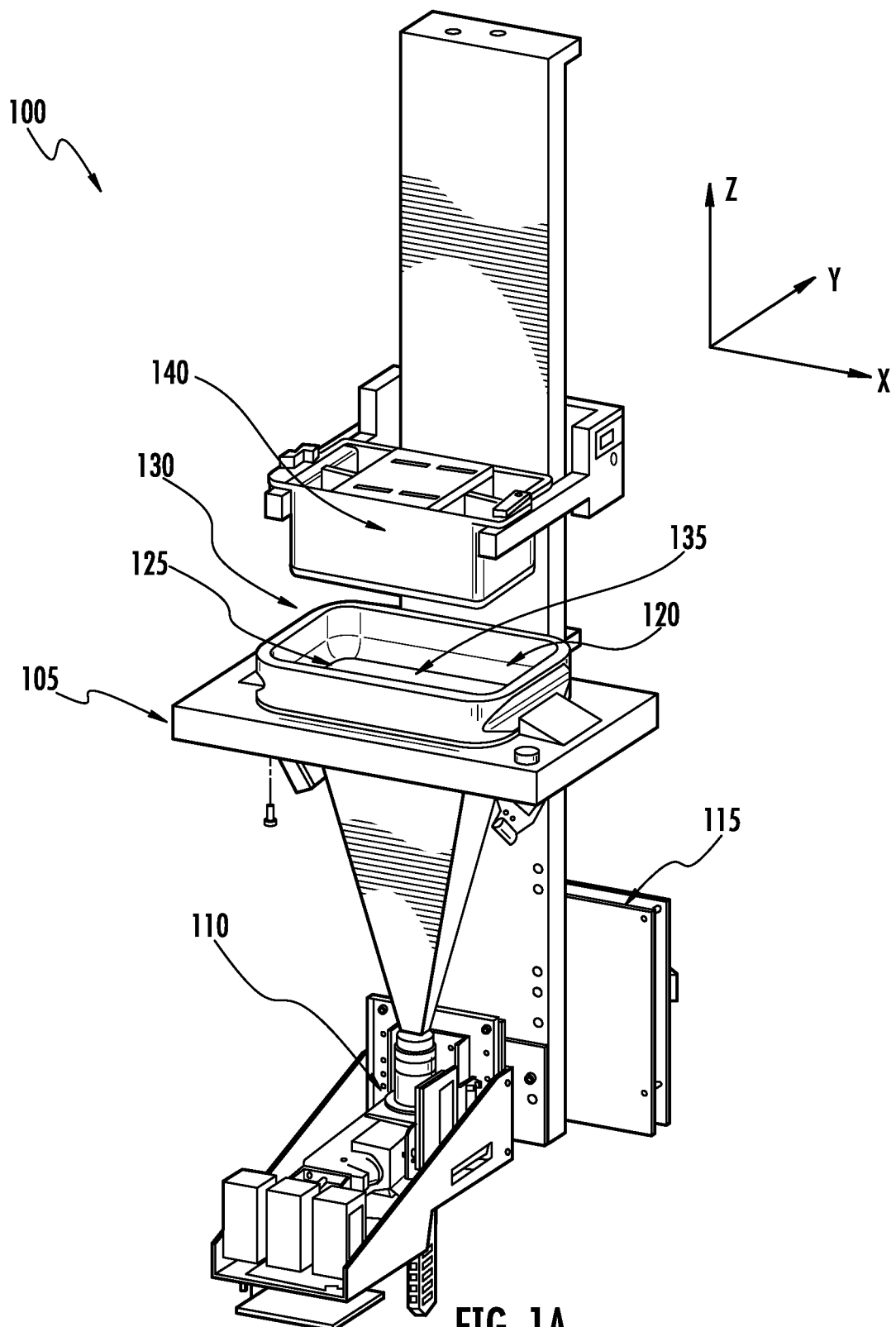
FIGS. 1A-1D are simplified schematics in perspective views of a photoreactive 3D printing systems (PRPS), in accordance with some embodiments.
Figure 1B:
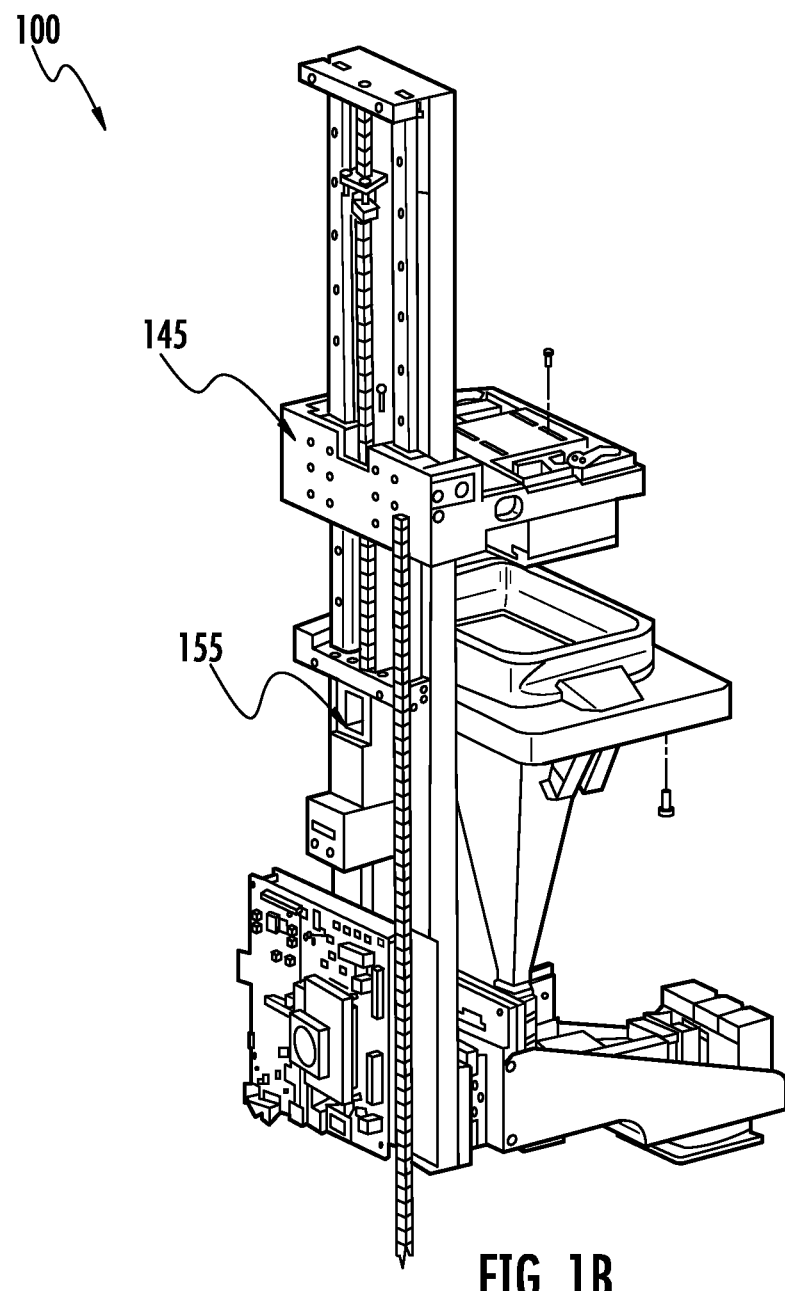
Figure 1C:
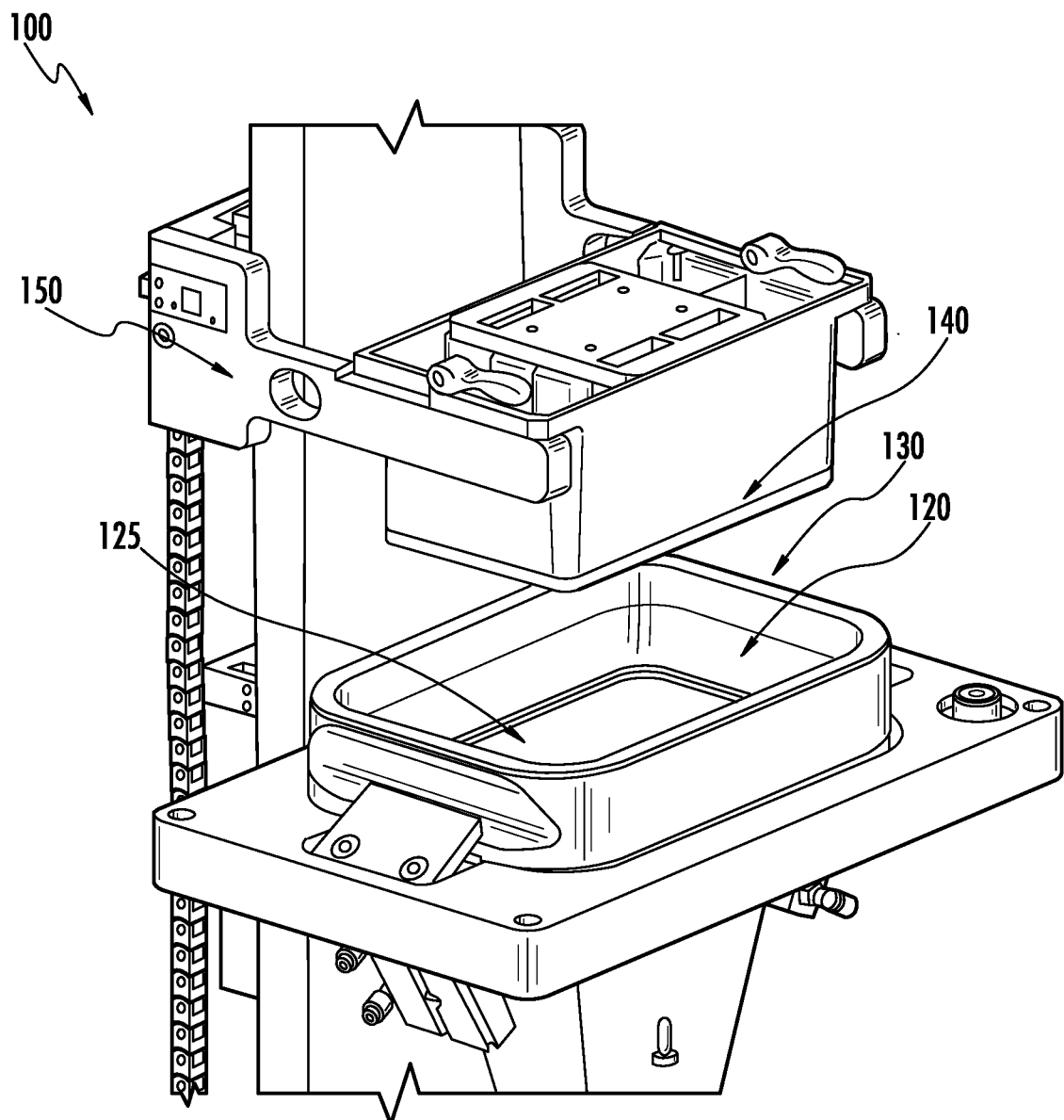
Figure 1D:
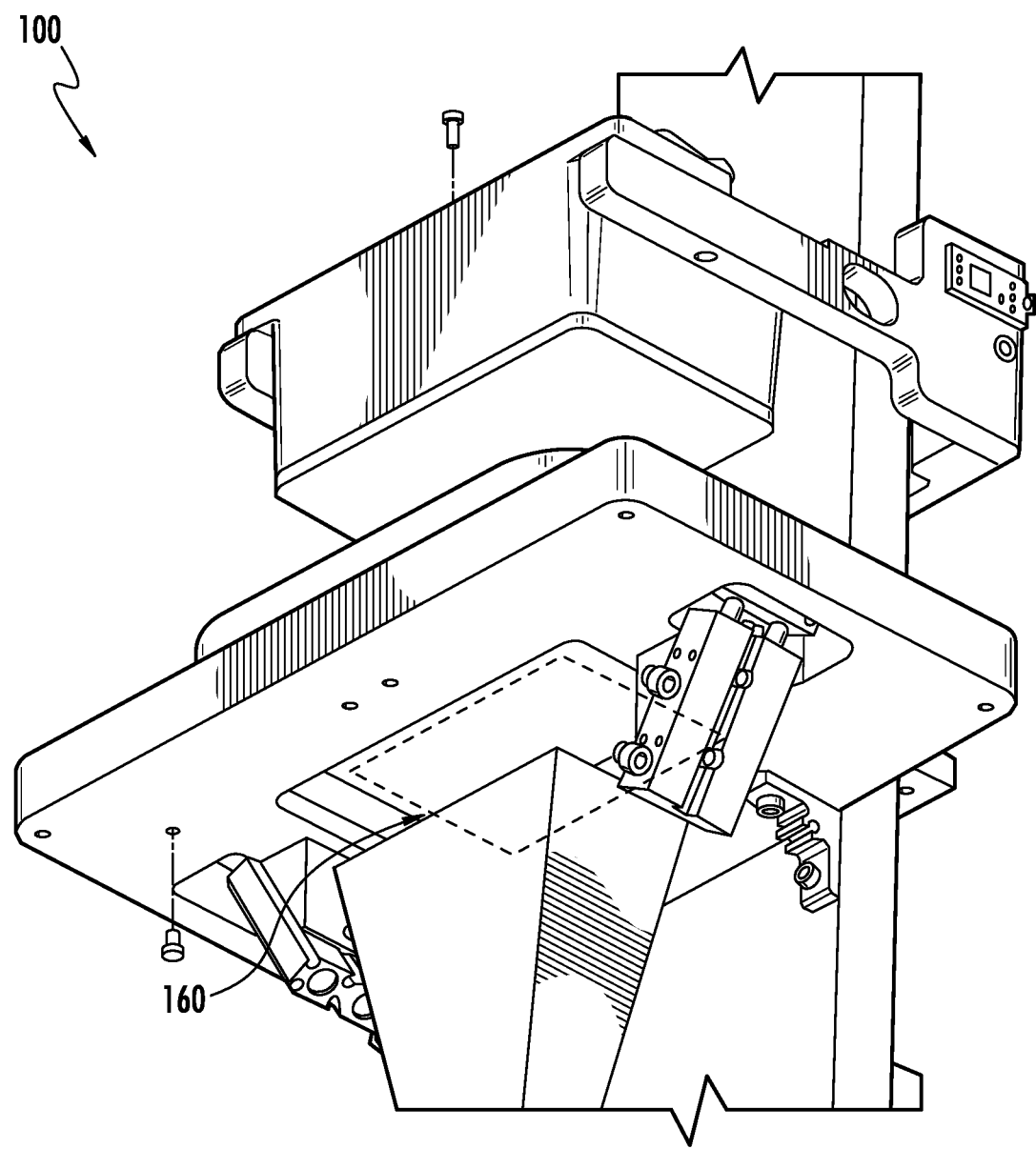

In the present disclosure, the following terms shall be used.

Resin: Generally refers to a monomer solution in an un-cured state.

Resin Pool: Volume of resin contained within a Resin Tub, immediately available for a Print Job.

Resin Tub: Mechanical assembly incorporating a membrane and which holds the resin pool.

Print Platform (i.e., Print Tray): System attached to the elevator upon which the resin is cured and the physical part (i.e., printed object) is built.

Elevator system: System of parts that connect the Z-Stage to the Print Platform.

Z-Stage: Electro-mechanical system that provides motion to the Elevator System.

Polymer Interface: The physical boundary of the Resin Pool and the Image Display System's focal plane.

Membrane: Transparent media creating the Polymer Interface, generally oriented parallel to the XY plane.

Build Area: Area of the XY plane that can be physically addressed by the Image Display System.

Print Job (i.e., Print Run): Sequence of events initiated by the first, up to and including the last command of a 3D print.

Print Process Parameters (PPPs): Input variables that determine the system behavior during a Print Job.

Print Process: Overall print system behavior as governed by the Print Process Parameters.

Exposure: Temporal duration during which energy is transferred to the Polymer Interface.

Irradiance: Radiant power, per unit area, incident upon a surface, e.g., the Polymer Interface.

Pixel: Smallest subdivision of the build area XY plane where Irradiance can be directly manipulated.

DETAILED DESCRIPTION

This disclosure describes additive manufacturing systems and methods with large build areas that are capable of high resolution and energy density. In some embodiments, the systems and methods utilize multiple image projectors to project a composite image onto the build area, thereby enabling large illumination areas with high pixel density (i.e., resolution) and high energy density. Such systems and methods are advantageous over conventional systems that increase the build area by magnifying an image from a single projector, which reduces the resolution and the projected energy density in the build area.

In some embodiments, the additive manufacturing system is a photoreactive 3D printing system (PRPS) and includes an image projection system with multiple image projectors. The image projection system can project a composite image onto a build area. A display subsystem can be used to control the image projection system using digital light processing (DLP). In some embodiments, the image projection system contains a plurality of image projectors, and the composite image contains a plurality of sub-images arranged in an array, where each of the image projectors projects a sub-image onto a portion of the build area.

In some embodiments, the display subsystem controls each of the image projectors in the image projection system to adjust the properties of each sub-image and the alignment of the position of each sub-image within the composite image. Some examples of digital filters that can be used by the display subsystem to adjust the properties of each sub-image include warp correction filters that provide geometric correction, filters with edge blending bars at one or more sub-image edges, irradiance mask filters that normalize irradiance, and "gamma" adjustment mask filters that adjust image (or sub-image) energy based on a reactivity of the resin being used. The use of filters that are applied (or overlaid) to a base source file (i.e., part of the instructions used to define the geometry of a part to be printed by the system), rather than changing the base source file itself, is advantageous because different filters can be used in different situations, or changed periodically, without changing the base source file. For example, the same base source file can be used with different resins by applying different gamma correction filters (associated with each different resin) to the unchanged base source file. Additionally, the base source file can be a vector-based file that includes desired physical dimensions for an object to be printed, while the filters can be discretized files (e.g., to line up with the pixels within the image projection system).

In some embodiments, the additive manufacturing system (i.e., the PRPS) further includes a calibration fixture containing a plurality of sets of light sensors. Each set of light sensors in the calibration fixture can be used to monitor a projected sub-image in a composite image. The properties of each sub-image and the alignment of the position of each sub-image within the composite image can then be adjusted using feedback from the plurality of sets of light sensors in the calibration fixture.

The intended image to be projected onto the build area can be referred to as the ideal composite image. Various issues can cause a composite image to be distorted compared to the ideal composite image. Some examples of issues that cause distortion of a composite image are mechanical assembly and mounting geometry (e.g., projectors with different angles relative to the build area that can lead to skewed projected sub-images), mechanical assembly and mounting inaccuracies (e.g., that can lead to misaligned sub-images), thermal effects that can misalign the projector systems (e.g., from LEDs, LED driving electronics, and other heat sources), and differences between projectors within the image projection system (e.g., variations in projected intensity between projectors). Furthermore, multiple issues that cause distortion of a composite image can act together, compounding the image distortion. For example, mechanical alignment tolerances for each part of the assembled PRPS (e.g., parts within the image projection system) can be met, but the slight misalignments for each part can stack up together and significantly distort the image. In some embodiments, the properties of each sub-image and the alignment of the position of each sub-image within the composite image are adjusted using digital filters to match (or substantially match) the ideal composite image. This can be beneficial because it can be more cost effective to adjust the properties of the sub-images to improve the composite image quality as described herein, compared to improving the mechanical alignment tolerances for the parts of the assembled PRPS to improve the composite image quality.

Some conventional large area displays (e.g., signs, projected movies, etc.) utilize composite images containing an array of sub-images projected from multiple image projectors, and employ filters to adjust the sub-images within the composite image. There are several substantial differences, however, between the requirements for large area displays and additive manufacturing systems that lead to significant differences in the image projection systems used in each application. Large area displays are used to display information to human observers, whose eyes are much less sensitive to variations than PRPSs. PRPSs use light to cause resin to react, and the reaction dynamics of the resin are much different (and less tolerant to deviations) than the response (and discrimination) of a human eye. As a result, the systems and methods used in conventional large area displays are not capable of meeting all of the requirements of additive manufacturing systems. Image projection systems that project composite images in additive manufacturing systems having substantial differences compared to large area displays are described in more detail below.

FIGS. 1A-1D illustrate an example of a PRPS 100, in accordance with some embodiments. The PRPS 100 shown in FIGS. 1A-1D contains a chassis 105, an image projection system (i.e. an "illumination system") 110, a display subsystem (i.e., an "image display system") 115, a resin pool 120, a polymer interface 125, a resin tub 130, a membrane 135, a print platform 140, an elevator system 145, elevator arms 150, a z-stage 155, and a build area 160. The operation of the example PRPS 100 shown in FIGS. 1A-1D will now be described.

The chassis 105 is a frame to which some of the PRPS 100 components (e.g., the elevator system 145) are attached. In some embodiments, one or more portions of the chassis 105 is oriented vertically, which defines a vertical direction (i.e., a z-direction) along which some of the PRPS 100 components (e.g., the elevator system 145) move. The print platform 140 is connected to the elevator arms 150, which are movably connected to the elevator system 145. The elevator system 145 enables the print platform 140 to move in the z-direction (as shown in FIG. 1A) through the action of the z-stage 155. The print platform 140 can thereby be lowered into the resin pool 120 to support the printed part and lift it out of the resin pool 120 during printing.

The illumination system 110 projects a first image through the membrane 135 into the resin pool 120 that is confined within the resin tub 130. The build area 160 is the area where the resin is exposed (e.g., to ultraviolet light from the illumination system) and crosslinks to form a first solid polymer layer on the print platform 140. Some non-limiting examples of resin materials include acrylates, epoxies, methacrylates, urethanes, silicone, vinyls, combinations thereof, or other photoreactive resins that crosslink upon exposure to illumination. Different photoreactive polymers have different curing times. Additionally, different resin formulations (e.g., different concentrations of photoreactive polymer to solvent, or different types of solvents) have different curing times. In some embodiments, the resin has a relatively short curing time compared to photosensitive resins with average curing times. Methods for adjusting the curing time for a specific resin (i.e., "gamma" corrections) are discussed further herein. In some embodiments, the resin is photosensitive to wavelengths of illumination from about 200 nm to about 500 nm, or to wavelengths outside of that range (e.g., greater than 500 nm, or from 500 nm to 1000 nm). In some embodiments, the resin forms a solid with properties after curing that are desirable for the specific object being fabricated, such as desirable mechanical properties (e.g., high fracture strength), desirable optical properties (e.g., high optical transmission in visible wavelengths), or desirable chemical properties (e.g., stable when exposed to moisture). After exposure of the first layer, the print platform 140 moves upwards (i.e., in the positive z-direction as shown in FIG. 1A), and a second layer can be formed by exposing a second pattern projected from the illumination system 110. This "bottom up" process can then be repeated until the entire object is printed, and the finished object is then lifted out of the resin pool 120.

In some embodiments, the illumination system 110 emits radiant energy (i.e., illumination) over a range of different wavelengths, for example, from 200 nm to 500 nm, or from 500 nm to 1000 nm, or over other wavelength ranges. The illumination system 110 can use any illumination source that is capable of projecting an image. Some non-limiting examples of illumination sources are arrays of light emitting diodes, liquid crystal based projection systems, liquid crystal displays (LCDs), liquid crystal on silicon (LCOS) displays, mercury vapor lamp based projection systems, digital light processing (DLP) projectors, discrete lasers, and laser projection systems.

Figure 1E:
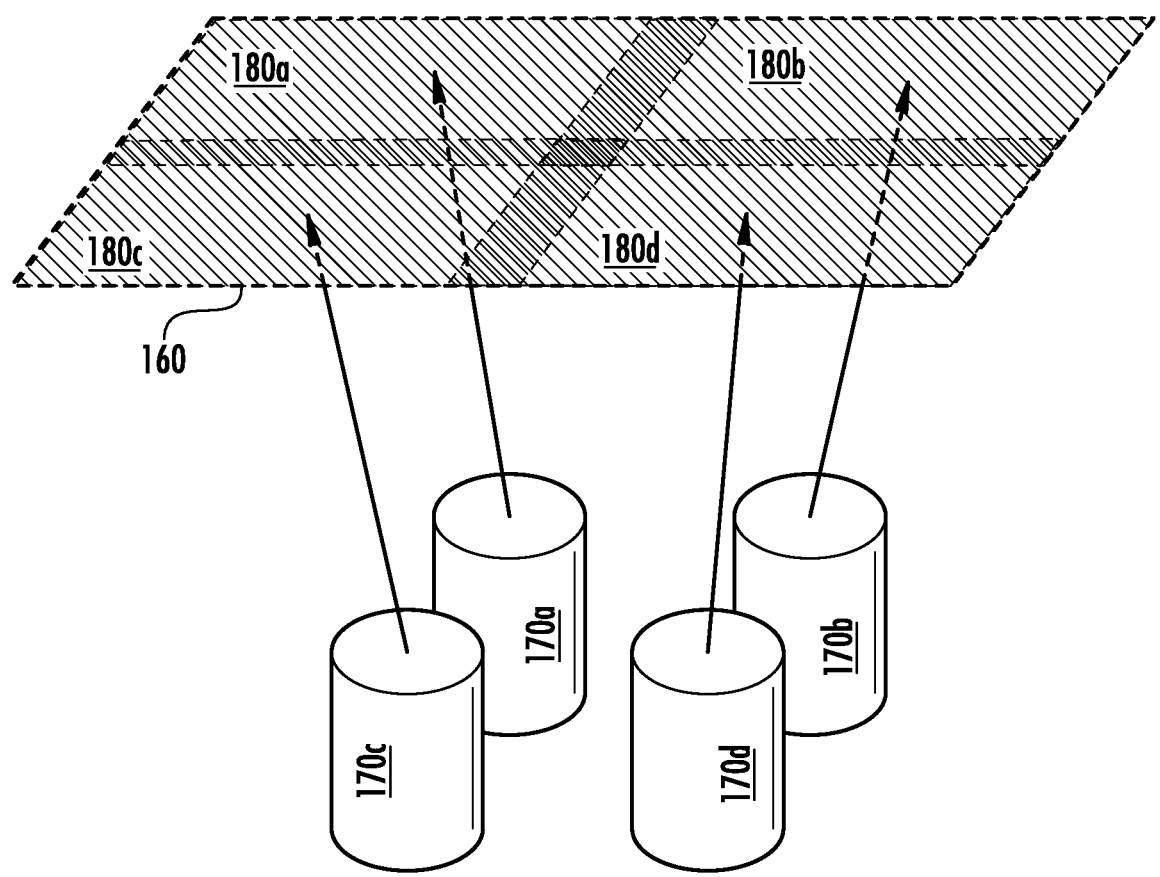
FIG. 1E is a simplified schematic in perspective view of a PRPS with four image projectors and a composite image with four sub-images, in accordance with some embodiments.

In some embodiments, the illumination systems (i.e., the image projection systems) of the PRPSs described herein (e.g., as shown in element 110 of the PRPS in FIGS. 1A-1D) contain a plurality of image projectors configured in an array. This can be advantageous to cover a large printing area with a high resolution of build element pixels without sacrificing print speed. FIG. 1E shows a simplified schematic example of a PRPS containing four image projectors 170*a-d* configured to project four sub-images 180*a-d* to form a single composite image over build area 160. FIG. 1E shows an example where the illumination systems are projection based systems, however, in other embodiments, the illumination systems can be projection or non-projection based systems including those that contain arrays of light emitting diodes, liquid crystal based projection systems, liquid crystal displays (LCDs), liquid crystal on silicon (LCOS) displays, mercury vapor lamp based projection systems, digital light processing (DLP) projectors, discrete lasers, and laser projection systems.

FIG. 1F shows three perspective schematics of a non-limiting example of a PRPS with two image projection systems 110*a-b*. The other components of the PRPS shown in FIG. 1F are similar to those shown in FIGS. 1A-1D, and some components of the PRPS are not shown in the system in FIG. 1F for clarity. The resin tub 130*a* and build area (not shown) within the resin tub are about twice as large as in the PRPS shown in FIGS. 1A-1D, which is enabled by using two image projection systems 110*a-b* rather than one.

Figure 1G:
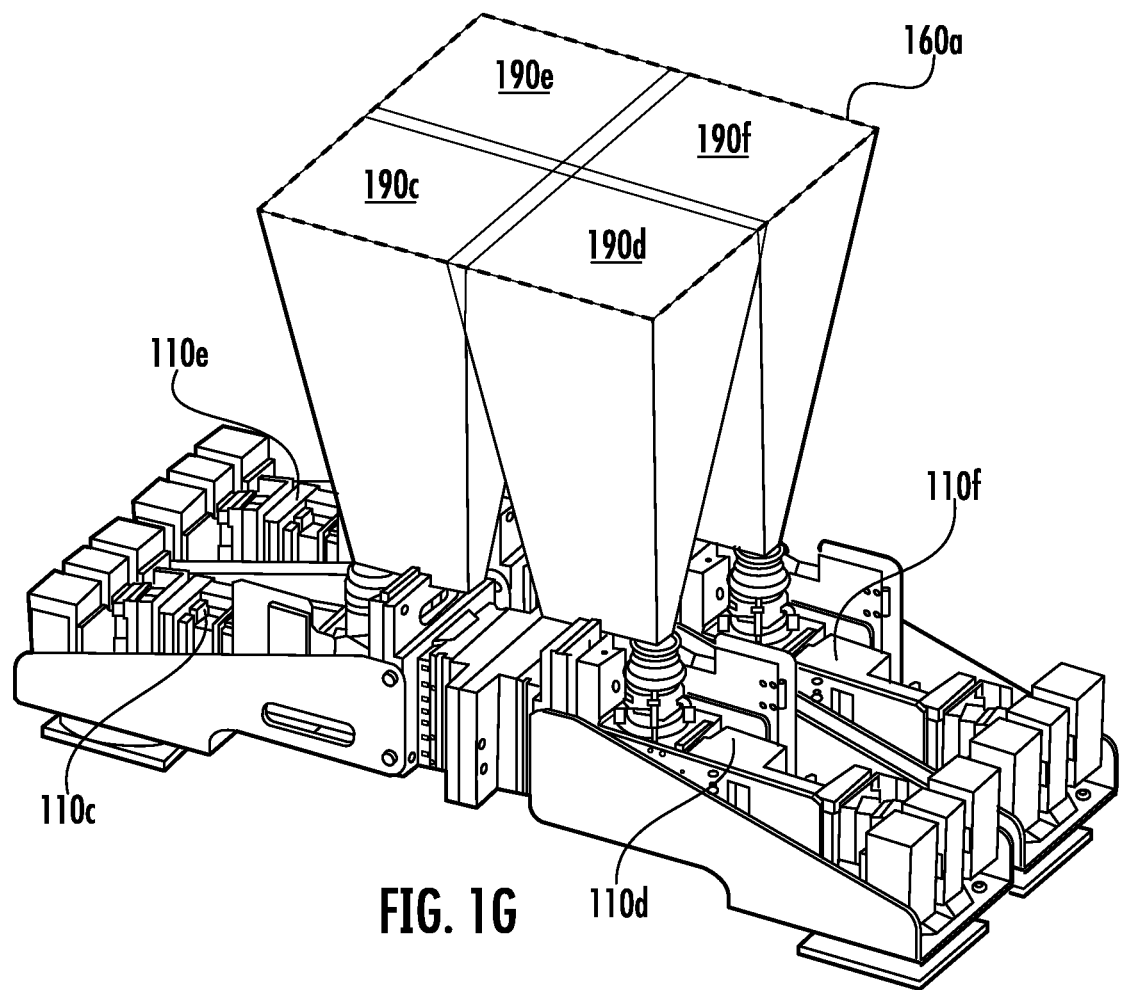
FIG. 1G is a simplified schematic of a portion of a PRPS in perspective view with four image projection systems, in accordance with some embodiments.

FIG. 1G shows a non-limiting example of a portion of a PRPS with four image projection systems 110*c-f*. In this example, the four image projection systems are arranged in a 2×2 array. In other embodiments, a PRPS has multiple image projection systems, which are arranged in an N×M array, where N is the number of image projection systems in one direction of the array and M is the number of image projection systems in another direction of the array, where N and/or M can be from 1 to 5, or 1 to 10, or 1 to 20, or 1 to 100, or 2, or 5, or 10, or 20, or 100. FIG. 1G shows four image projection systems 110c-f configured to project four sub-images 190c-f, respectively, to form a single composite image over build area 160a. FIG. 1G also shows that the sub-images overlap in this example.

The systems and methods described herein can minimize (or eliminate) unit by unit variation of each projected sub-image within a composite image in a PRPS. Due to unit by unit variations, each image projector within an image projection system creates a unique image, both from a geometric and power (radiant energy) standpoint. The variations between sub-images is exacerbated by the resin irradiance and reactivity relationships, which can cause subtle variations in geometry or power to have large effects on the final printed part.

In some embodiments, the build area is from 100×100 $mm^2$ to 1000×1000 $mm^2$, or from 100×100 $mm^2$ to 500×500 $mm^2$, or from 100×1000 $mm^2$ to 500×1000 $mm^2$, or square or rectangular ranges in between the previous ranges, or larger than 1000×1000 $mm^2$. In some embodiments, the sub-images projected from the image projectors each have an area that is from 50×50 $mm^2$ to 200×200 $mm^2$, or from 50×50 $mm^2$ to 150×150 $mm^2$, or from 50×100 $mm^2$ to 100×200 $mm^2$, or from 50×50 $mm^2$ to 150×150 $mm^2$, or 192 mm×102.4 mm, or 134.4 mm×71.68 mm. In some embodiments, the area covered by each sub-image is approximately rectangular, square, circular, oval, or other shape. In some embodiments, each image projector projects light with maximum or average power densities from 5 $mW/cm^2$ to 50 $mW/cm^2$, or from 10 $mW/cm^2$ to 50 $mW/cm^2$, or from 5 $mW/cm^2$ to 20 $mW/cm^2$. In some embodiments, the exposure time of each pixel or layer is from 0.05 s to 3000 s, or from 0.08 s to 1500 s, or from 0.08 s to 500 s, or from 0.05 s to 1500 s.

The example PRPS 100 shown in FIGS. 1A-1D and the PRPSs shown in FIGS. 1E-1G, are non-limiting examples only, and variations on these designs can be made in accordance with some embodiments described herein. For example, other PRPSs can be inverted with respect to the system shown in FIGS. 1A-1G. In such "top down" systems, the illumination source is above the resin pool, the print area is at the upper surface of the resin pool, and the print platform moves down within the resin pool between each printed layer. The image projection systems and methods described herein are applicable to any PRPS configuration, including inverted systems. In some cases, the systems and methods described herein (e.g., the geometry of the image projection systems) can change to accommodate a different PRPS geometry, without changing their fundamental operation. In other examples, the PRPSs can contain more of fewer image projectors than those shown in FIGS. 1A-1G. And, as described herein, in some embodiments, the present PRPSs contain moving image projectors or moving optical systems.

Figure 2A:
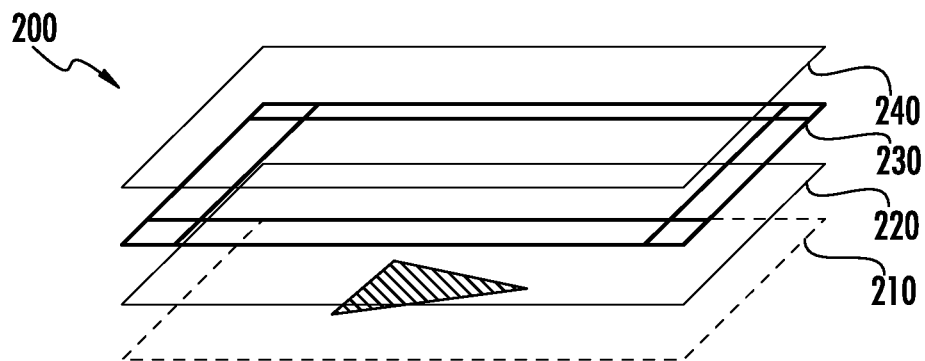
FIG. 2A is a simplified schematic example of a stack of digital filters used to adjust an image (or sub-image) projected in a PRPS, in accordance with some embodiments.

FIG. 2A shows an example of a stack of digital filters 200 used to adjust an image (or sub-image) projected in a PRPS (e.g., PRPS 100 in FIGS. 1A-1D), in accordance with some embodiments. The stack of multiple digital filters 200 is applied to the image to adjust different properties of a projected image and/or the alignment of the position of a projected image. In the example shown in FIG. 2A, a stack of digital filters 200 containing a warp correction filter 210, a resin reactivity "gamma" adjustment mask filter 220, a filter with edge blending bars 230, and an irradiance mask filter 240 is applied to a projected image. In some embodiments, one digital filter is applied to an image. In other embodiments, a stack of digital filters containing more than 1 digital filter, from 1 to 5 digital filters, or from 1 to 10 digital filters are applied to an image. In some embodiments, a filter stack contains 1 or more of a given type of filter. For example, a filter stack can contain 1 or more warp correction filters, 1 or more resin reactivity "gamma" adjustment mask filters, 1 or more filters with edge blending bars, and/or 1 or more irradiance mask filters. The example stack of filters shown in FIG. 2A can be used to correct sub-images in PRPSs with projection or non-projection based illumination systems including those that contain arrays of light emitting diodes, liquid crystal based projection systems, liquid crystal displays (LCDs), liquid crystal on silicon (LCOS) displays, mercury vapor lamp based projection systems, digital light processing (DLP) projectors, discrete lasers, and laser projection systems.

Figure 2B:
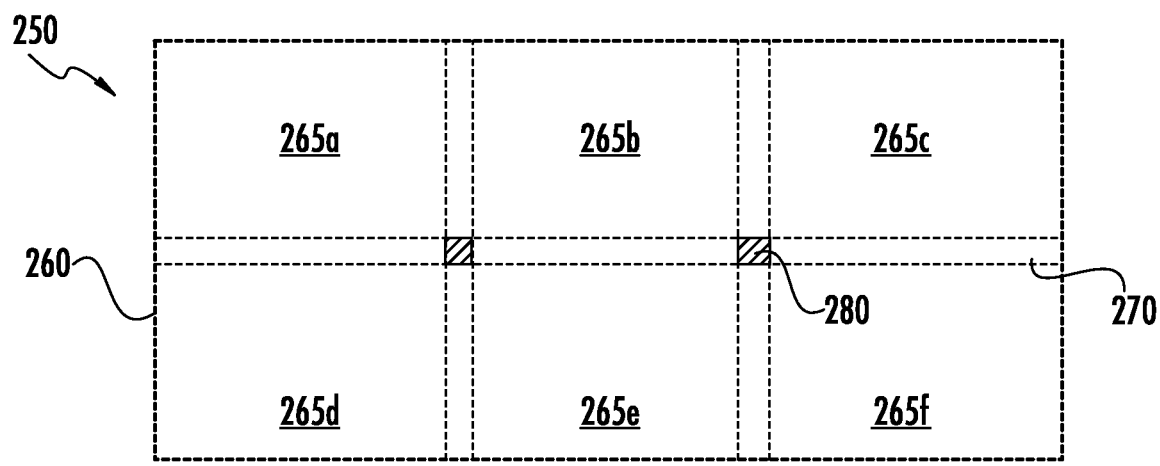
FIG. 2B is a simplified schematic example of a composite image covering a build area, where the composite image contains 6 sub-images, in accordance with some embodiments.

In some embodiments, a plurality of digital filters (or a plurality of stacks of digital filters) are applied to a plurality of sub-images that make up a composite image, and the properties of each sub-image and the alignment of the position of each sub-image within the composite image are adjusted by the stack of digital filters. FIG. 2B shows an example of a composite image 250 covering a build area 260, where the composite image contains 6 sub-images 265a-f. In this example, the sub-images 265a-f overlap at the edges creating a first set of regions 270 where two sub-images overlap and a second set of regions 280 where four sub-images overlap. In this example 6 sets of digital filters can be applied, one to each sub-image 265a-f in composite image 250 to correct for distortions in the individual sub-images and to align the sub-images with one another.

One example of a type of digital filter that can be used to adjust an image is a warp correction filter 210, wherein the filter applies 4 point (or more than 4 point) warp correction to an image (or sub-image in a composite image) enabling projected image geometric correction. For example, a warp correction filter can be used to correct warp or skew in projected images that are caused by variation in projector optics or alignment within the build area. In embodiments where a composite image contains multiple sub-images, the warp correction filter can be used to correct the warp of each sub-image, and allow the sub-images to be aligned with each other to form the composite image. Correcting the warp can enable more accurate alignment and other corrections to be made on sub-images within a composite image. Warp correction can also enable PRPSs to print curved (or non-planar, or non-2D) layers (or slices), which is useful for some applications and part types.

Figure 3:
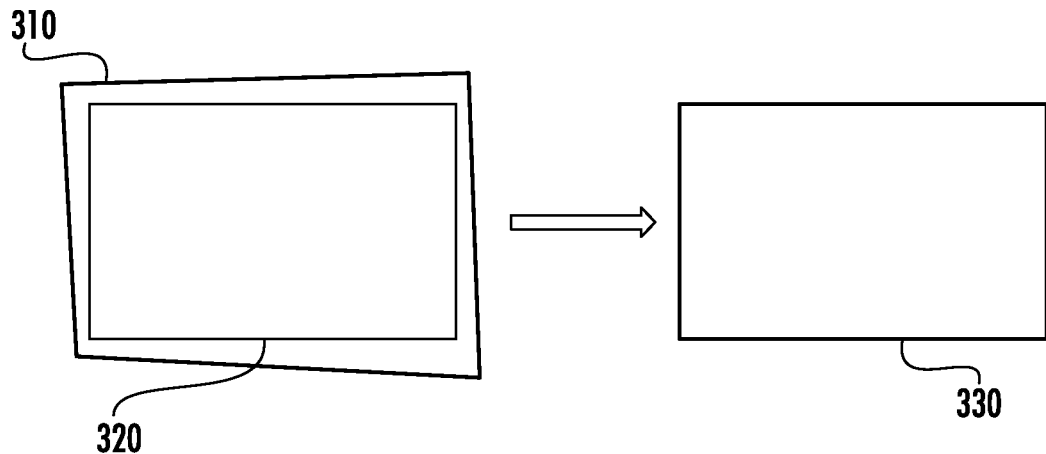
FIG. 3 is a simplified schematic example of warp correction where a warped projected image has been corrected, in accordance with some embodiments.

FIG. 3 shows an example of warp correction where a warped projected image has been corrected (e.g., to align with an area within the build area). FIG. 3 shows an uncorrected projector field of view (FOV) 310 that contains a warp distortion and a desired projector FOV 320. FIG. 3 also shows the projected FOV 330 after correction using a warp correction filter, which aligns the post-correction projector FOV 330 with the desired projector FOV 320.

Another example of a type of digital filter that can be used to adjust an image is an edge blending filter, where each image (or sub-image in a composite image) has programmable blending bars on one or more edges of the image (e.g., the top, left, bottom, and/or right edge of the image). Edge blending allows the top, left, right and/or bottom edges to be faded out according to a chosen blending function. In a composite image containing an array of sub-images, edge blending can enable the data at the perimeters of adjacent projected sub-images to be faded out so that the transition between the adjacent sub-images can be made less noticeable. For example, composite image 250 in FIG. 2B contains an array of sub-images 265a-f that overlap one another in regions 270 and 280, and edge blending can enable the data within the overlapping regions 270 and 280 to be faded out so that the transition between adjacent sub-images can be made less noticeable. In PRPSs using multiple image projectors to project a composite image, less noticeable transitions between the projected sub-images translates into improved quality of a printed object (e.g., improved printed object surface roughness and/or structural integrity). The blending distance and blending function can be adjusted for each image. Some examples of blending functions are linear, sigmoid, and geometric.

Figure 4A:
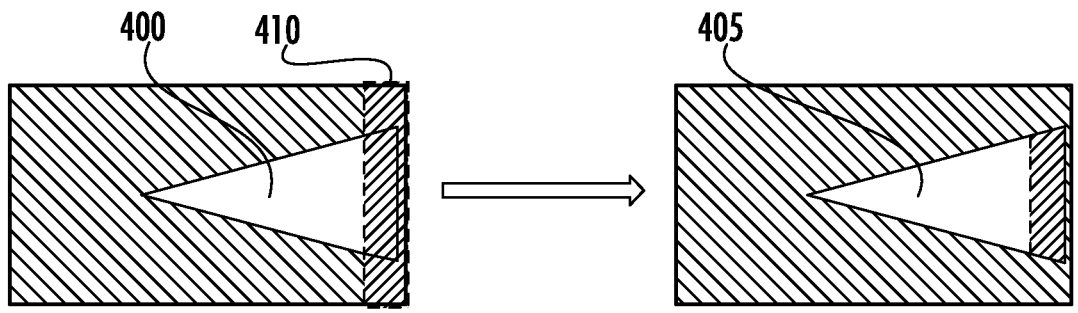
FIGS. 4A and 4B are simplified schematic examples of edge blending filters that can be applied to an image, in accordance with some embodiments.
Figure 4B:
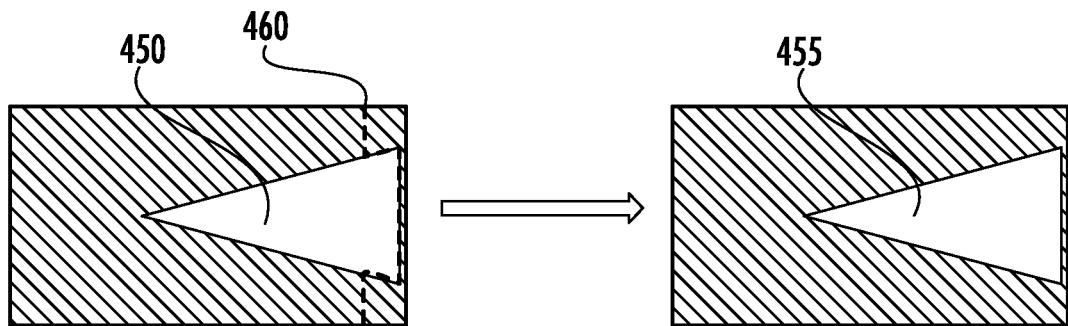

FIGS. 4A and 4B show some non-limiting examples of edge blending filters that can be applied to an image. FIG. 4A shows an example where one edge of an image 400 contains a blending bar 410. The intensity of the image within the area of the blending bar 410 is reduced using a blending function to produce the image 405. For example, a linear blending function can be used that reduces the intensity of the pixels linearly across the blending bar 410 such that the intensity of the pixels is highest towards the interior of the image and lowest towards the edge of the image within the blending bar 410. In some embodiments, an edge blending filter can contain 4 edge blending bars (i.e., one on the top, one on the right, one on the left, and one on the bottom of the image). In some embodiments, the edge blending bars will overlap with each other at the corners of an image, and cause the intensity in the corner of the image to be reduced by additive effects of more than one edge blending function. For example, the overlapping regions 270 and 280 in composite image 250 in FIG. 2B can be linearly faded out as described above, causing intensity variations between adjacent sub-images to be less noticeable than if no edge blending correction was done.

In some embodiments, the number of edge blending bars, the edge blending distances, and the edge blending functions are chosen based on the distance of overlap between adjacent sub-images within a composite image. In some embodiments, two adjacent sub-images in a composite image overlap at one edge, and the overlapping regions of both sub-images contain edge blending bars. In some such cases, the edge blending distances and the edge blending functions for both sub-images are chosen such that the total intensity of the pixels within the overlapping region substantially match the intensity of the ideal composite image within that region. In one non-limiting example, edge blending can be used to fade out the pixels of a first sub-image as they approach an edge boundary at the same rate as the pixels of a second adjacent overlapping sub-image are faded in as they move away from the edge boundary into the second sub-image. In some embodiments, the edge blending filters enable a constant irradiance (or a total irradiance more closely matching the ideal composite image) when both sub-image pixels are combined within the overlapping region.

In some embodiments, sub-images from multiple projectors overlap and the percentage the areas of adjacent sub-images that overlap with each other are 0%, approximately 0%, approximately 1%, approximately 2%, approximately 5%, approximately 10%, approximately 20%, approximately 50%, approximately 90%, or approximately 100%, or from 0% to 100%, or from approximately 1% to approximately 5%, or from approximately 5% to approximately 100%, or from approximately 50% to approximately 100% (or any ranges in between). Overlapping sub-images can be beneficial to minimize artifacts between sub-images (e.g., with 1% to 5% overlap, and using edge blending filters). Overlapping sub-images (e.g., with 50% to 100% overlap) can also be beneficial to increase the local power within the composite image without increasing the power of individual image projectors in the system, which can enable shorter curing and exposure times. In some embodiments, edge blending filters can be used when some sub-images within the composite image overlap with one another and some do not. In some cases, when the overlap area between adjacent sub-images is small (e.g., 0% or approximately 0%), then adjacent sub-images can be scaled (i.e., the magnification of the sub-image can be changed) to improve their alignment.

FIG. 4B illustrates an example where geometric correction is used in edge blending to analyze adjacent sub-images, and one sub-image is selected to exclusively display the layer data. This allows the location of the transition (or seam) 460 between sub-image 450 and the adjacent sub-image (not shown) to be positioned based on one or more layer boundary locations within the layer being displayed. In this example, sub-image 450 is the sub-image before edge blending and sub-image 455 is the sub-image after edge blending. In this case, the transition 460 was chosen to leave a portion of sub-image 450 within the overlap region between the sub-images intact after the edge blending is performed, and the sub-image 455 (after edge blending) is the same as sub-image 450 (before edge blending). In other words, the transition 460 was determined based on a layer boundary location within the sub-image 450. This can be useful, for example, if the data ends (i.e., contains a boundary) in the overlapping region (e.g., a region of illuminated pixels has a boundary within the overlap region), then one sub-image can be chosen to display the content within the overlapping region, and the overlapping region of the other sub-image can be attenuated to zero intensity. In other examples, by analyzing the geometry of the layer across the boundary, the seam between sub-images can be hidden exclusively within the part or at an edge boundary, thereby allowing the effects of any slight misalignment in multiple projectors to be minimized.

Figure 4C:
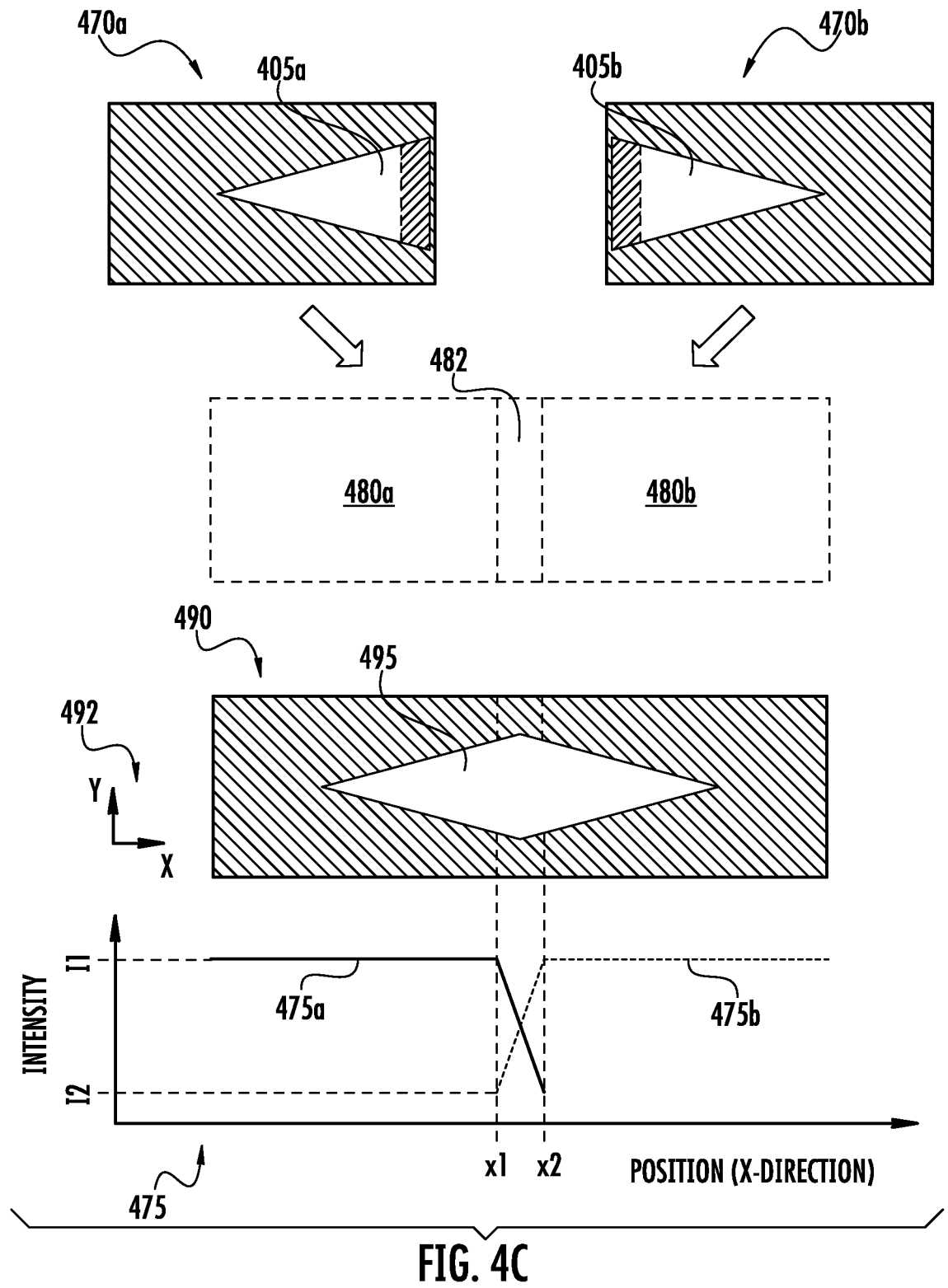
FIG. 4C is a simplified schematic example showing how two adjacent overlapping sub-images can utilize edge blending filters to form a single composite image, in accordance with some embodiments.

FIG. 4C shows a non-limiting example of how two adjacent overlapping sub-images 470a-b can utilize edge blending filters (i.e., with edge blending bars) to form a single composite image 490 with minimal edge artifacts in the overlapping region 482 of the sub-images. Sub-images 470a-b each contain a portion 405a-b of a feature 495 to be printed in a single layer. The sub-images 470a-b will be positioned such that they overlap in locations 480a-b, with overlapping region 482.

The illumination intensity (or intensity) of each sub-image is shown in plot 475 along the x-direction in composite image 490 defined by the direction legend 492. The intensity of sub-image 470a follows the intensity function 475a, and the intensity of sub-image 470b follow the intensity function 475b. Intensity functions 475a-b show that the intensity of the sub-images 470a-b are constant (at value I1) outside of the overlap region 482, while within overlap region 482 (between positions x1 and x2 in plot 475), the intensities of sub-images 470a-b are reduced in a complementary linear manner down to a lower intensity I2. In some embodiments, I2 can be zero intensity, or close to zero intensity, or can be any intensity that is less than I1. In other embodiments, the functions within the overlap region can be non-linear (e.g., sigmoid or geometric, or be described by a decreasing polynomial, logarithmic, exponential, or asymptotic function) and/or be not perfectly complementary (i.e., one image can have a higher average intensity within the overlap region than the other). The composite image 490 contains a feature 495 which has minimal artifacts (e.g., unintended low or high intensity regions) within the composite image 490, due in part to the edge blending filters used.

Figure 4D:
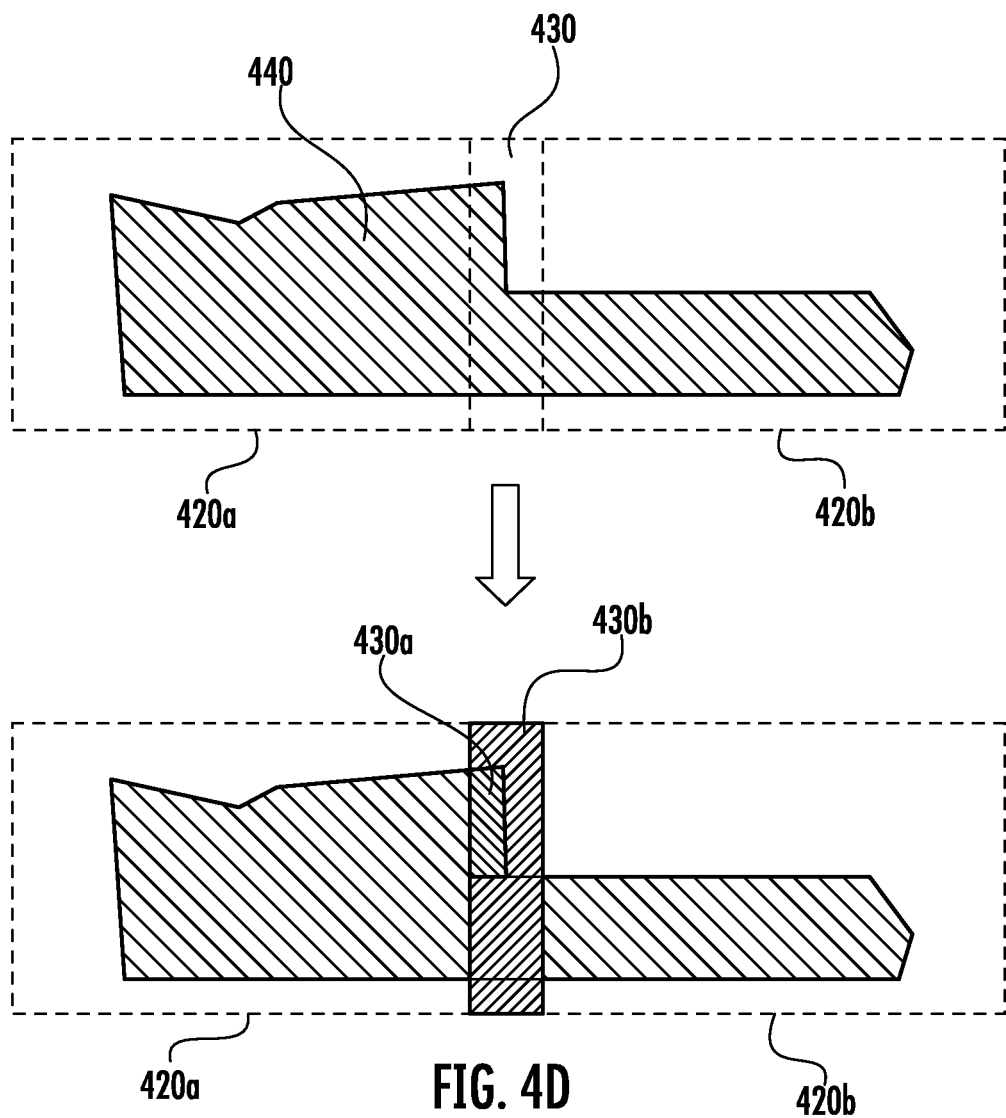
FIG. 4D is a simplified schematic example where different types of edge blending filters can be used together in concert within a single overlap region, in accordance with some embodiments.

FIG. 4D shows a non-limiting example where different types of edge blending filters can be used together in concert within a single overlap region. FIG. 4D shows two sub-images 420*a-b* that overlap in region 430, and the composite image contains a feature 440. One region of the feature within the overlap region 430 has a boundary that ends within the overlap region, and this region 430*a* is not blended—rather the region 430*a* has 100% of the intensity from sub-image 420*a*, and 0% intensity from sub-image 420*b*. The rest of the overlap region 430*b* (i.e., the whole overlap region 430 except the region 430*a*) can be blended by taking some intensity from sub-image 420*a* and some intensity from sub-image 420*b* (e.g., as discussed above, and in the example depicted in FIG. 4C). Therefore, FIG. 4D illustrates another example of how one or more edge blending bars can adjust one or more images (or sub-images) based on a layer boundary location within the object being manufactured.

Another example of a type of digital filter that can be used to adjust an image is an irradiance masking filter, where the filter applies a normalizing irradiance mask to an image (or each sub-image in a composite image) such that the image (or composite image) has a uniform irradiance range (i.e., from zero exposure to a maximum exposure limit) across the area. For example, irradiance masking filters can be used to normalize the irradiance non-uniformities within the image projection system arising from projector-based spatial energy non-uniformities. Irradiance masking filters can be applied to the image projection system as a whole (i.e., on the composite image), and/or to each of the sub-images individually to correct differences between sub-images. In some embodiments, the parameters of the irradiance mask filter are set based on lowest region of energy (i.e., that corresponds to the darkest region of pixels) in display plane. In some embodiments, the parameters of the irradiance mask filter are set based on highest region of energy (i.e., that corresponds to the brightest region of pixels) in display plane. In some embodiments, the parameters of the irradiance mask filter are set based on the range, average, median, or other calculated quantities of the energy distribution in display plane. In some embodiments, the highest energy region (i.e., brightest pixel region) can be used to determine the offset magnitude from the lowest energy region in the irradiance mask filters. In some embodiments, the irradiance mask filters enable control over the energy across the build area to compensate for non-uniformities in the projector optics and/or optical path. In some embodiments, the output power from an image projector is limited to less than 100% of its maximum output power using an irradiance mask filter. Limiting an image projector's power to less than 100% can be advantageous to avoid damaging the system components, and to maintain consistency of output power as the light source within the projector ages (i.e., as the light source ages the output power can be increased to maintain a constant irradiance from the image projector over time).

Another example of a type of digital filter that can be used to adjust an image is gamma correction, where the composite image (or each sub-image in a composite image) has a gamma correction filter applied that is based on the particular resin reactivity ranges in the PRPS. In some embodiments, based on the curing behavior of a particular resin, the gamma correction filter for the composite image (or sub-images within the composite image) is optimized to map the irradiance range to the particular resin reactivity range. This can enable smoother and more accurate surfaces to be realized across different resins. The reactivity of the resin can change based on the resin composition (e.g., pigments, photo-initiators, photo-initiator concentrations, etc.). Furthermore, resins tend to have nonlinear response curves with respect to energy. Gamma correction filter provides resin reactivity leveling, and enables correct smoothing (and/or antialiasing) of pixels by mapping the pixel intensity range (e.g., 0-255) to the minimum and maximum reactivity characteristics of the pixel. Gamma correction filters can be used to correct sub-images in PRPSs with projection or non-projection based illumination systems including those that contain arrays of light emitting diodes, liquid crystal based projection systems, liquid crystal displays (LCDs), liquid crystal on silicon (LCOS) displays, mercury vapor lamp based projection systems, digital light processing (DLP) projectors, discrete lasers, and laser projection systems.

Figure 5A:
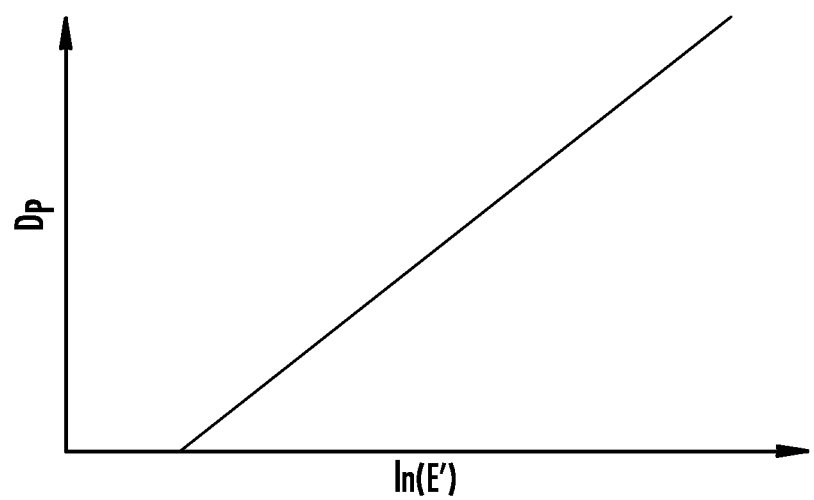
FIGS. 5A-5B are plots illustrating one example of a gamma correction relationship that can be used in a gamma correction filter, in accordance with some embodiments.
Figure 5B:
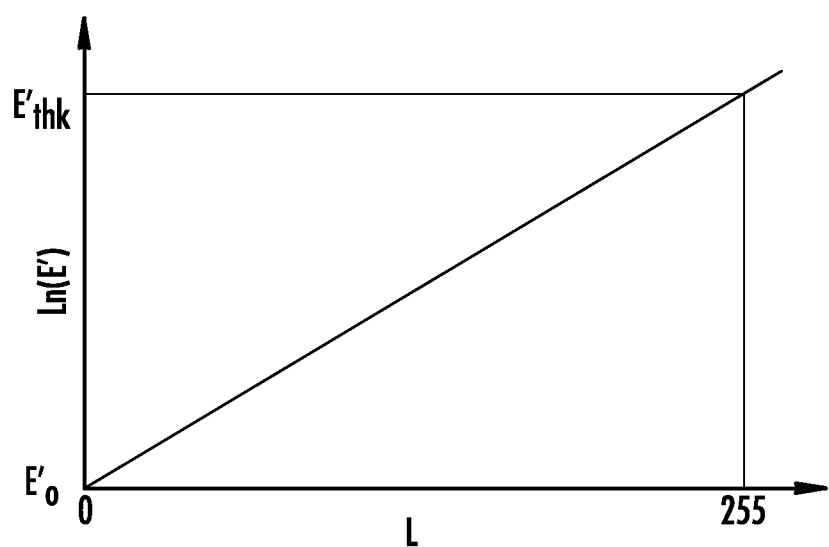

FIGS. 5A-5B illustrate one example of a gamma correction relationship that can be used in a gamma correction filter. In the example shown in FIGS. 5A-5B, a logarithmic relationship between the irradiance energy per unit area (E') and the pixel intensity (L) is used. The energy per unit area E' is related to the output illumination from the illumination source (e.g., an image projector) and the pixel intensity L is an input defining the geometry of a part to be printed (i.e., from a source file with the part geometry).

The cure depth $D_p$, can be represented by the logarithmic function $$D_p = m_1 * \ln(E') + b_1 \tag{1}$$

where E' is the energy per unit area, and $m_1$ and $b_1$ are constants that are particular to a given resin formulation. FIG. 5A graphically depicts this logarithmic relationship where $D_p$ is plotted on the y-axis against ln(E') on the x-axis. E' can also be defined by the expression $$E' = T_{exp} * Ir \tag{2}$$

where $T_{exp}$ is the exposure time and Ir is the irradiance impinging on the resin. Rearranging equation (1), combining with equation (2), and rearranging again yields the expression $$T_{exp} = \exp((D_p - b_1)/m_1)/Ir \tag{3}$$

which can be used to calculate the exposure time required to achieve a particular cure depth, for a particular combination of irradiance level and resin cure behavior.

The expression (1) and the graph in FIG. 5A can be used to determine the energy per unit area $E'_0$ that will produce a cure depth of zero. This will determine the minimum irradiance in the irradiance range (i.e., to produce a cure depth of zero). To calculate $E'_0$, equation (1) can be solved for $D_p = 0$, producing the expression $$E'_0 = \exp(-b_1/m_1). \tag{4}$$

Similarly, expression (1) can be solved for a maximum energy per unit area $E_{max}'$ by solving expression (1) for a maximum desired cure depth $D_{p,max}$. In some cases, the $D_{p,max}$ is related to a physical constraint of the PRPS (e.g., how much power the illumination system can output). The resulting expression is $$E'_{max} = \exp((D_{p,max} - b_1)/m_1). \tag{5}$$

The energy per unit area E' can be related to the pixel intensity L by the logarithmic function $$\mathrm{Ln}(E')=b_2+m_2*L \qquad (6)$$

where $m_2$ and $b_2$ are constants that are particular to a given resin formulation. The relationship in equation 6 is shown in the plot in FIG. 5B where ln(E') is plotted on the y-axis against L on the x-axis. Solving equation 6 for L=0 and L=255 allows the determination of $b_2$ and $m_2$. Plugging the determined $b_2$ and $m_2$ values into equation 6 yields the relationship $$E'=E'_0*(E'_{max}/E'_0)^{(L/255)}. \qquad (7)$$

Equation 7 is a relationship that can be used to map the pixel intensity L to an energy per unit area in the build plane E', which takes advantage of the full dynamic range of pixel intensity levels L that will yield cured resin. In other words, using equation 7, a pixel intensity of L=0 corresponds to an energy per unit area E' that will produce a minimum cure depth, $D_p=0$, in the resin. Similarly, using equation 7, a pixel intensity of L=255 corresponds to an energy per unit area E' that will produce a maximum cure depth, $D_p=D_{p,max}$, in the resin.

Using the relationships shown above in equations (1)-(7) and in FIGS. 5A-5B, gamma correction filters can be implemented to map the irradiance range used during printing to a particular reactivity range for a given resin formulation. This is beneficial because different resins have different reactivity ranges that require different irradiance and exposure times to achieve the same cure depth. Gamma correction filters, therefore, allow PRPSs to employ different resin systems with different reactivity ranges while achieving desired cure depths within the printed part.

In other embodiments, different relationships between the cure depth ($D_p$) and the energy per unit area (E') are possible. For example, rather than logarithmic, the relationship between cure depth ($D_p$) and the energy per unit area (E') can follow another continuous function (e.g., a polynomial, or asymptotic function), a piece-wise continuous function (e.g., containing different polynomials or logarithmic functions for different regions of the relationship), or can be non-analytical (e.g., can be based on a look-up-table). Similar relationships as those shown in FIGS. 5A-5B and equations (1)-(7) will still apply in these situations, and the same gamma correction concepts, systems and methods as those described herein can be used. Additionally, in the example depicted in equations (1)-(7), the pixel intensity L varies from 0-255, however, in other examples, the pixel intensity can vary over any range and the concepts described can still be used for gamma correction.

Figure 6:
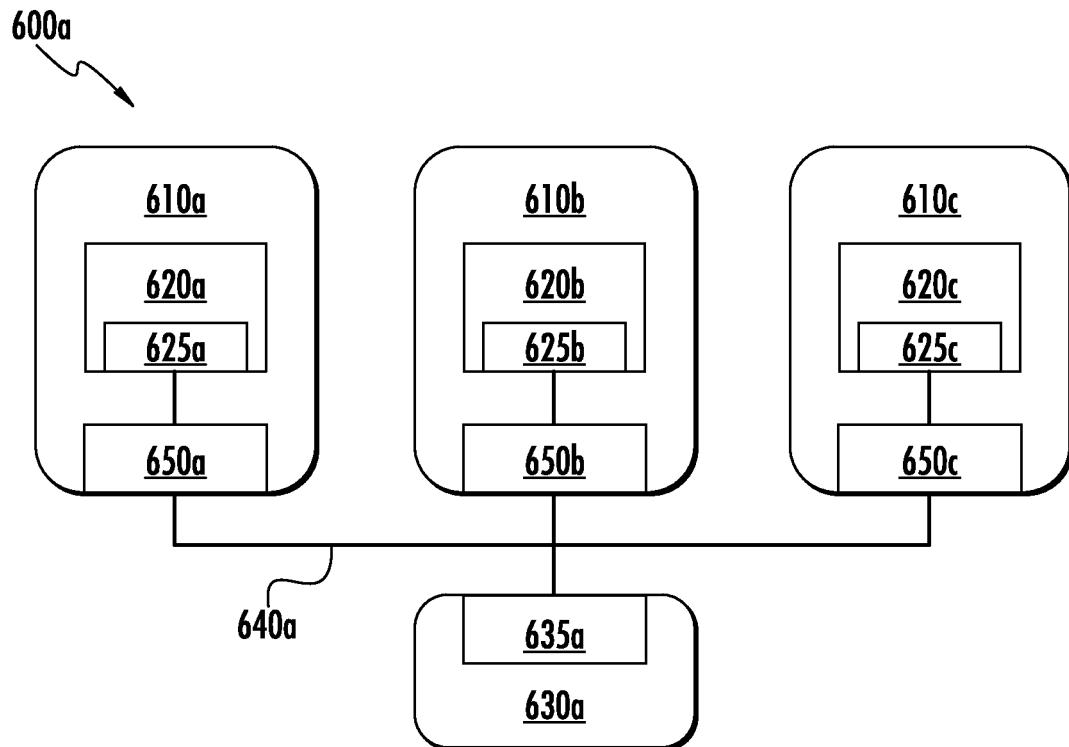
FIGS. 6 and 7 are simplified examples of electrical schematics of image projection systems for PRPSs using hardware systems to synchronize multiple projection illumination systems together, in accordance with some embodiments.
Figure 7:
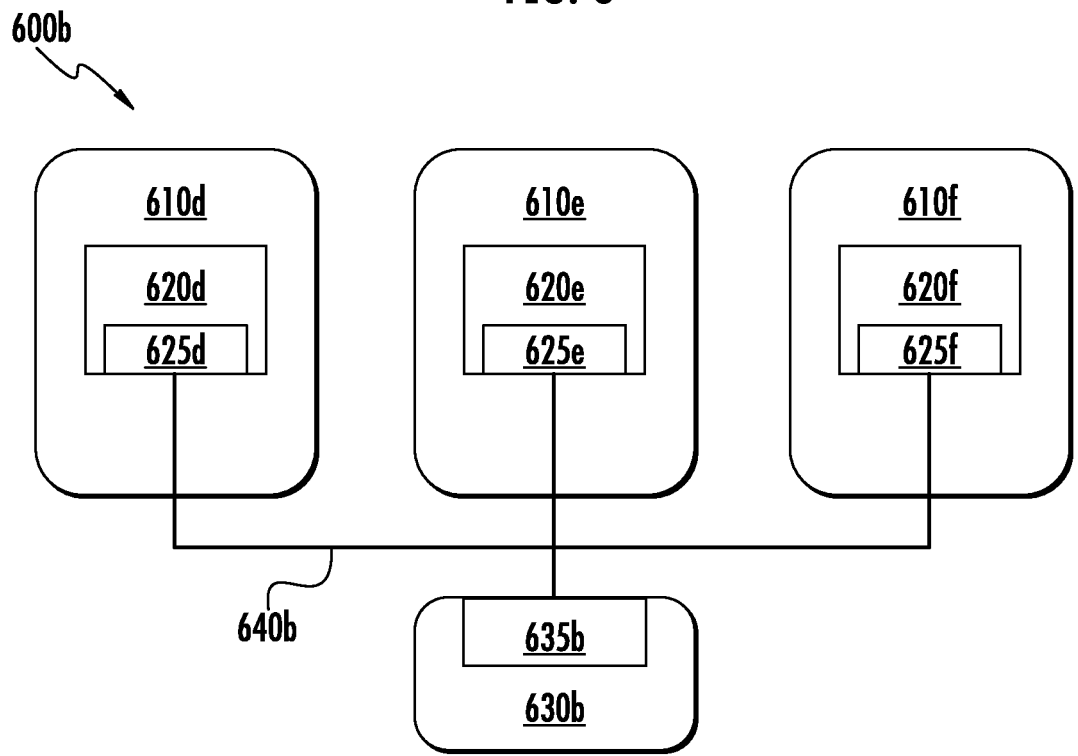

FIGS. 6 and 7 show examples of image projection systems 600a-b for PRPSs using hardware systems to synchronize multiple projection illumination systems 610a-f together. The examples in FIGS. 6-7 show three projection illumination systems 610a-f in each system 600a-b, however there can be less or more than three image projectors in different cases (e.g., more than three, from 2 to 10, or from 2 to 100). In some embodiments, image projection systems for PRPSs contain LED light sources that use electronic LED drive circuits 620a-f to control the light power emitted by each projector. The image projection systems in these examples contain multiple image projectors (i.e., projection illumination systems) 610a-f connected to a system controller 630a-b through the LED drive circuits 620a-f. The LED driver systems (i.e., LED drive circuits) 620a-f in these examples each have an enable input 625a-f on the driver circuit to control (e.g., gate) the light output. The enable inputs 625a-f in these examples can be controlled by the system controller 630a-b, which is equipped with digital/analog outputs 635a-b to drive the enable inputs 625a-f of the multiple projectors 610a-f. The physical connections 640a-b between the system controller 630a-b and projection illumination systems 610a-f can be either electrical or optical cabling.

The outputs 635a-b on the system controller 630a-b can be buffered, isolated, and/or amplified in order to overcome any potential weak drive strength or noise immunity issues from the on-board processor (or GPIO-Expander, etc.) of the system controller. Such buffers or isolators can reside either on or off the system controller board.

Likewise, the enable inputs of the LED drive circuits of each projection illumination system can also be buffered, isolated, and/or amplified to reshape the signal from the system controller and mitigate the effects of electrical noise distorting the signal between the system controller and the LED drive circuit. The buffering, isolation, and/or amplification can improve the noise immunity and system reliability. The location of the buffers, isolators, or amplifiers can be positioned in a number of ways to achieve the same goal. For example, buffers, isolators, and/or amplifiers can be positioned at the outputs 635a-b of the system controller 630a-b and not the inputs of the LED drive circuits, or vice versa. In the example shown in FIG. 6, the buffers, isolators, and/or amplifiers 650a-c are positioned at both the outputs 635a of the system controller 630a and the inputs of the LED drive circuits 620a-c. In the example shown in FIG. 7, no buffers, isolators, or amplifiers are used (neither at the outputs 635b of the system controller 630b nor at the inputs of the LED drive circuits 620d-f).

FIGS. 8A-8D show further examples of image projection systems for PRPSs using hardware solutions to synchronize multiple projection illumination systems together with more detail than FIGS. 6 and 7. The image projectors (labeled as "Projector 1", "Projector 2" . . . "Projector N" in the figures) each contain an LED drive circuit (labeled as "LED Drive" in the figures) with enable inputs (labeled as "EN" in the figures). Each of the image projectors is connected to the display subsystem (labeled as "Master Control System" in the figures) through hardware "cabled connections". Each cabled connection has terminals (in some cases with digital grounds) at the output of the display subsystem and at the input of each image projector.

Different options for isolation, buffering and/or amplification at the input of the LED drive circuit are shown in FIGS. 8A-8D. In different embodiments, the different image projectors in the image projection system can contain opto-isolated, transistor buffered, integrated buffered, or non-buffered and non-isolated circuits at the inputs of their respective LED drive circuits. "Projector 1" in FIGS. 8A-8D contains an example of an "opto-isolated" circuit at the input of the LED drive circuit. "Projector 2" in FIGS. 8A-8D contains an example of a "transistor buffered" circuit at the input of the LED drive circuit. "Projector 3" in FIGS. 8A-8D contains an example of an "integrated buffered" circuit at the input of the LED drive circuit. "Projector 4" in FIGS. 8A-8D contains an example of a non-buffered and non-isolated input of the LED drive circuit. The systems shown in FIGS. 8A-8D are non-limiting examples to illustrate the different types of circuits that can be used. In some embodiments, the plurality of image projectors in the image projection system each contain the same type of circuits, or different types of circuits, or a mixture of the same and different types of circuits at the inputs of their respective LED drive circuits.

Different options for the display subsystem (labeled as "Master Control System" in the figures) are also shown in FIGS. 8A-8D. The display subsystem can contain a real-time processor/controller (i.e., the system controller, or a portion thereof) with a single output as shown in the example in FIG. 8A (the single output from the system controller is labeled "Output"). In other embodiments, the display subsystem can contain a real-time processor controller with multiple outputs as shown in the example in FIG. 8B (the multiple outputs from the system controller are labeled "Out 1", "Out 2" . . . . "Out N"). In some embodiments, the display subsystem can contain a real-time processor controller with an onboard FPGA (i.e., integrated with the master control system) as shown in the example in FIG. 8C, or an offboard FPGA (separate from the master control system) as shown in the example in FIG. 8D. In some embodiments, the system controller (e.g., shown in FIGS. 6 and 7) and master controller (e.g., shown in FIGS. 8A-8D) are the same physical unit. In some embodiments, the system controller and master controller are different physical units. For example, the system controller relative to an individual projective print engine can be a custom real-time embedded printed circuit assembly board where the master controller that resides above such engines can be an off-the-shelf industrial computer with multiple inputs and outputs. In some embodiments, a master controller controls several print engines.

Figure 8A:
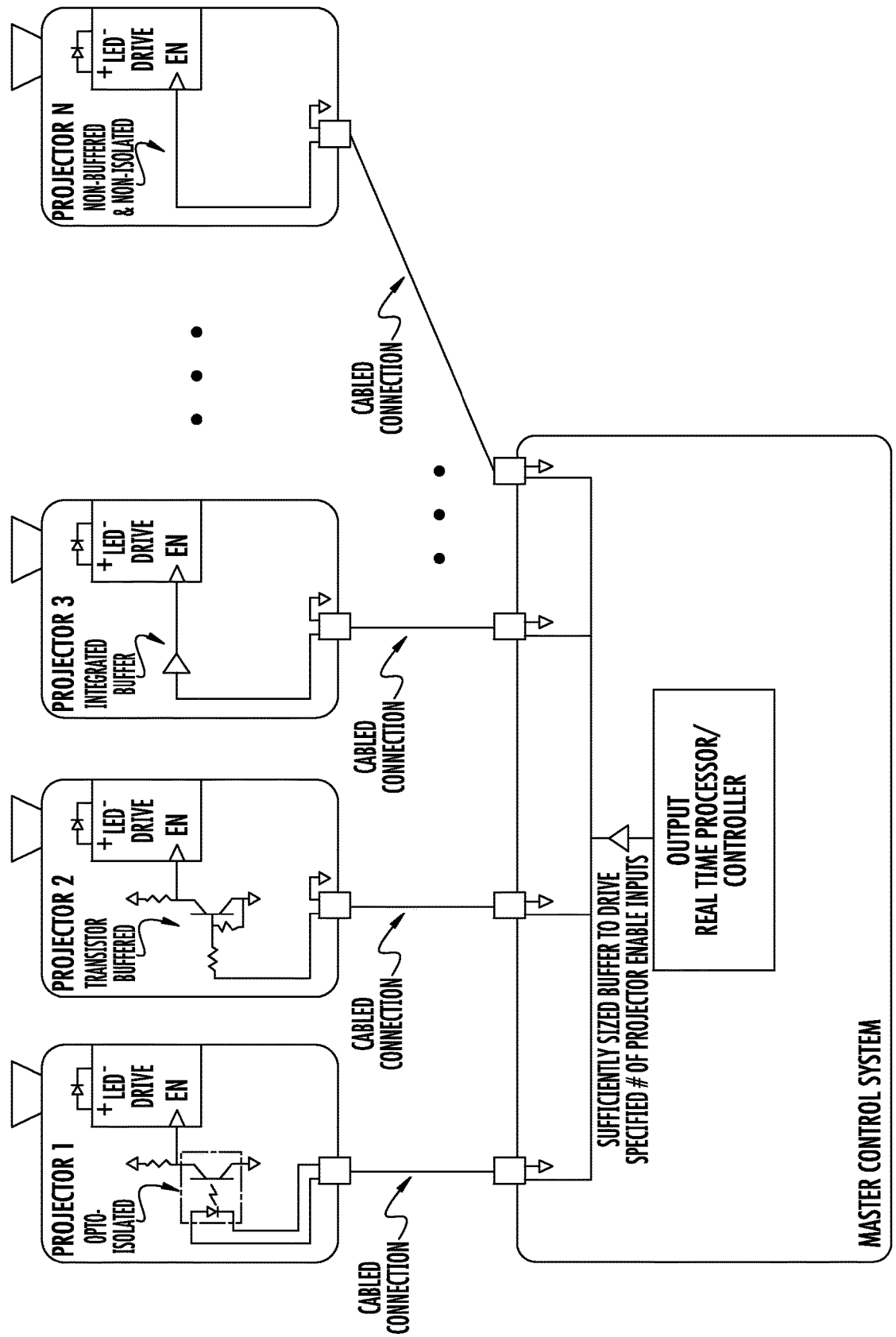
FIGS. 8A-8D are simplified examples of electrical schematics including schematics of the display subsystems for image projection systems for PRPSs using hardware systems to synchronize multiple projection illumination systems together, in accordance with some embodiments.
Figure 8B:
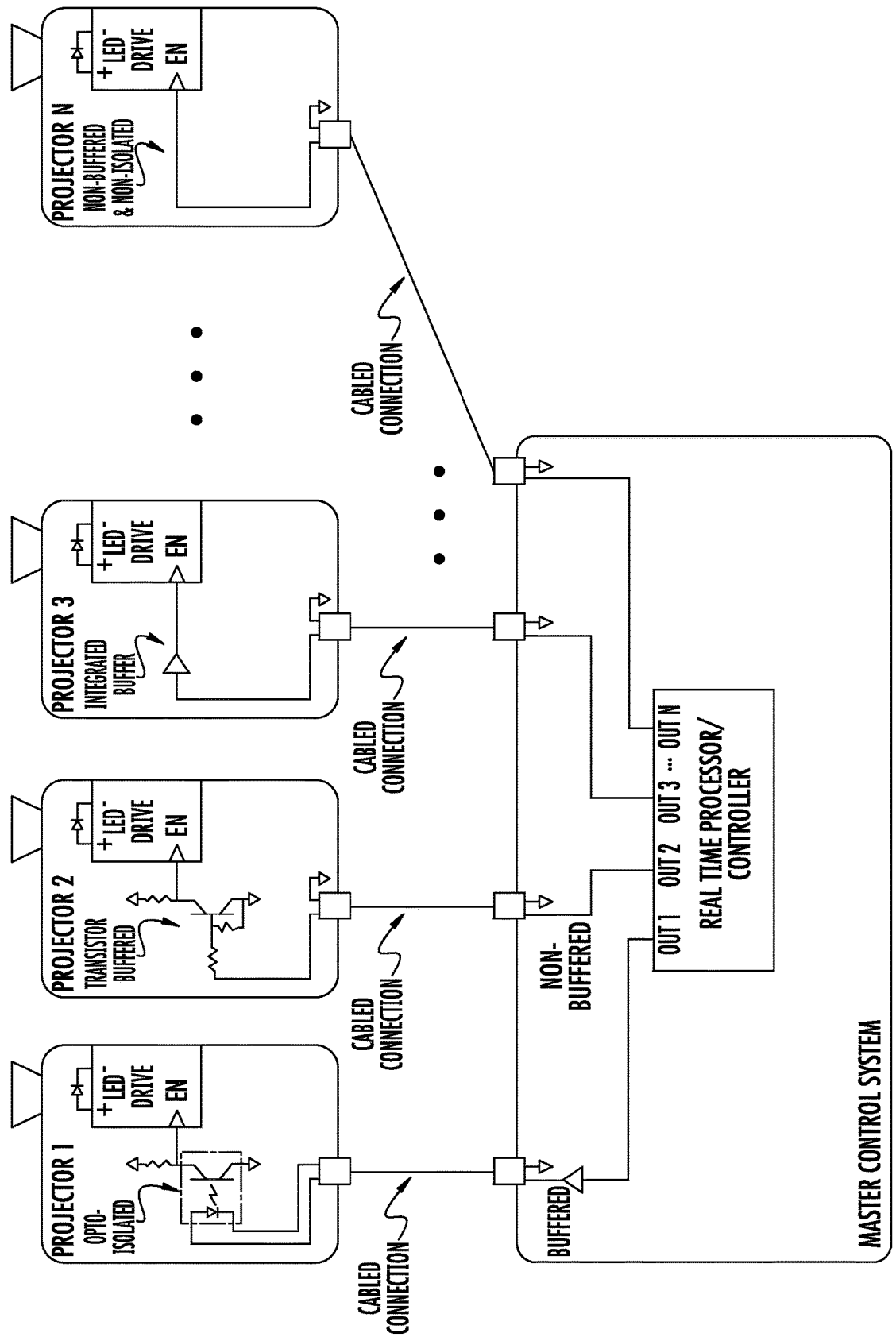
Figure 8C:
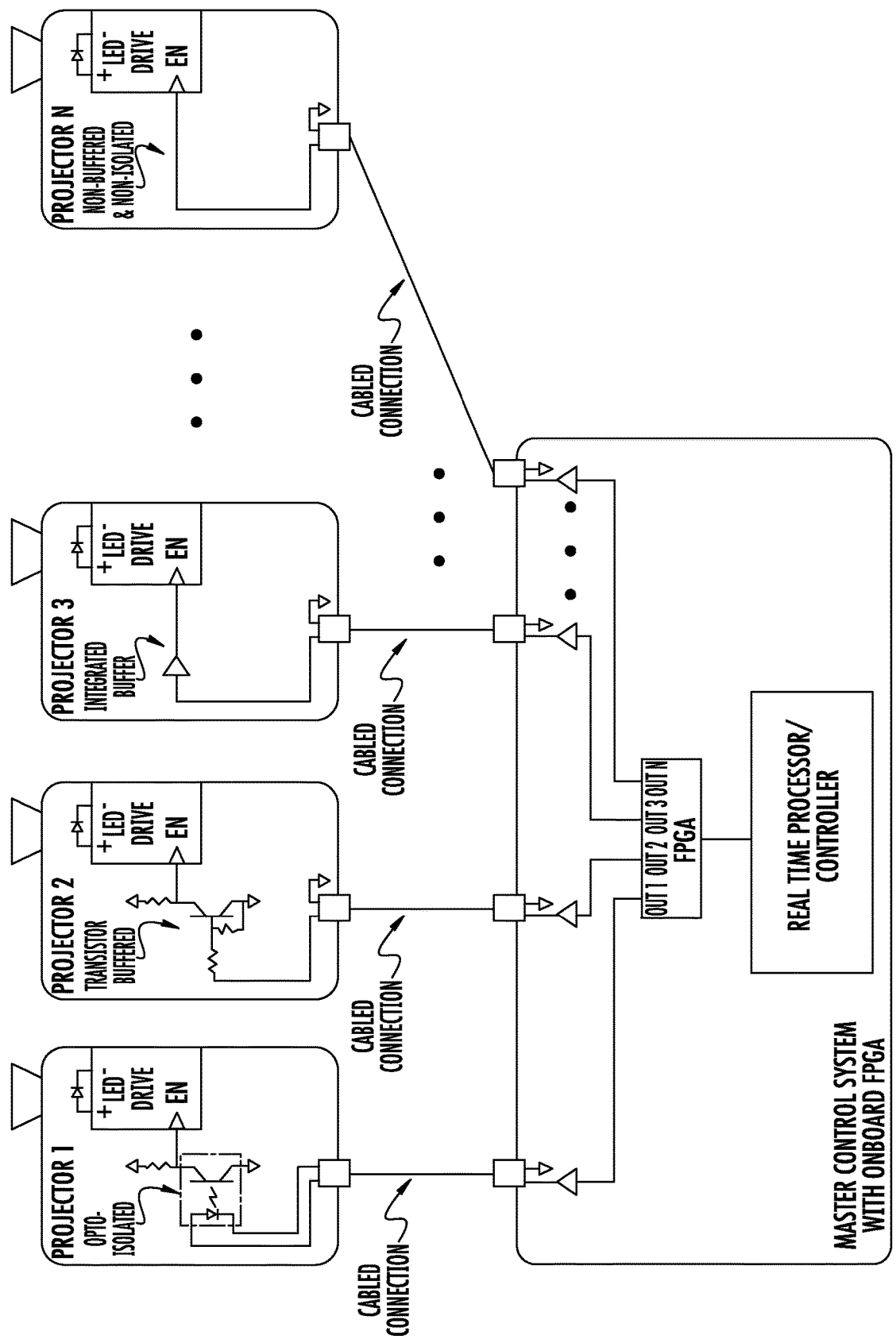
Figure 8D:
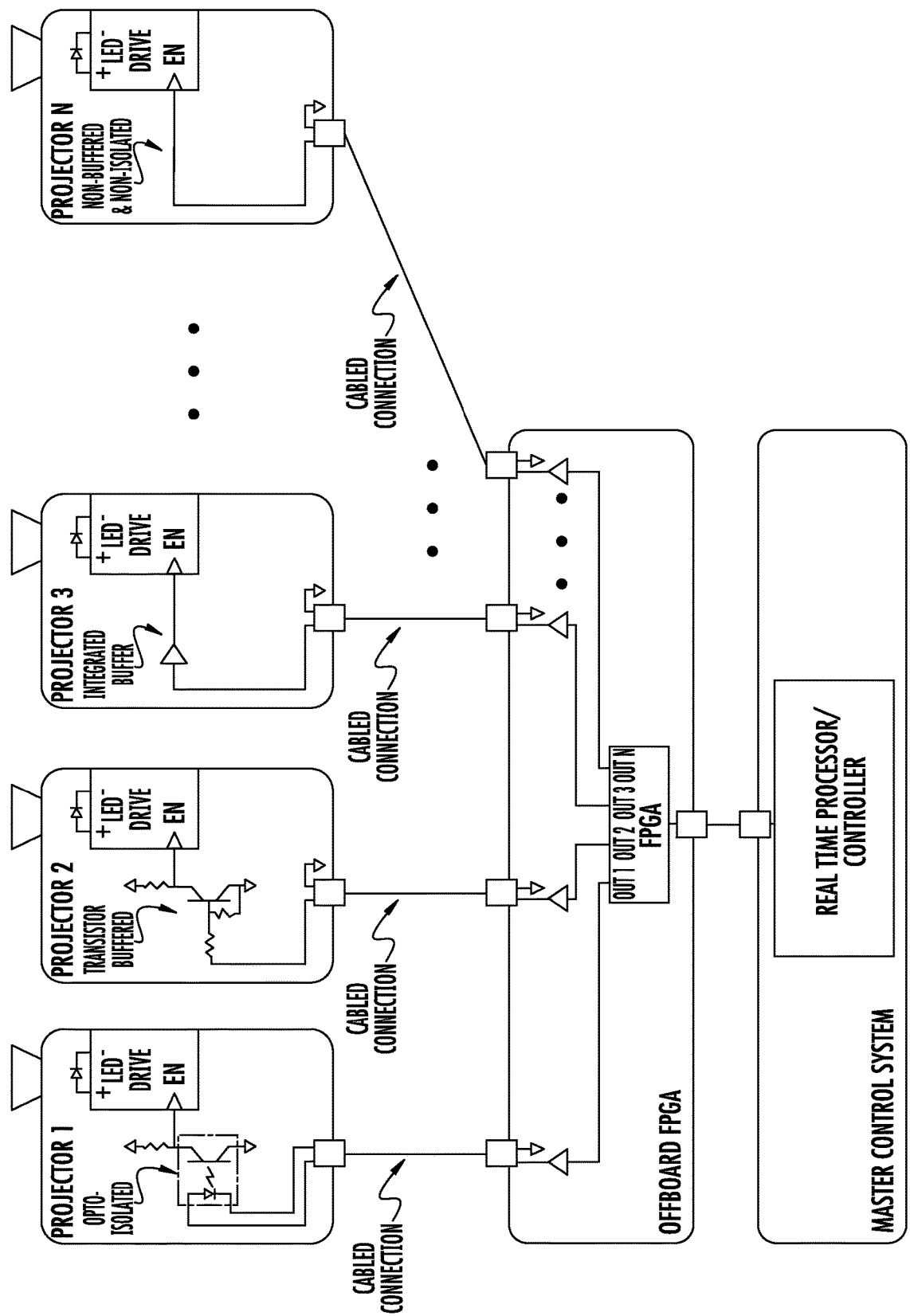

The outputs from the display subsystem can be buffered (e.g., as shown in the "Out 1" output in FIG. 8B), or non-buffered (e.g., as shown in the "Out 2" output in FIG. 8B). In cases where the display subsystem contains a real-time processor controller with a single output, the single output can be buffered with a sufficiently sized buffer to drive all of the plurality of enable inputs on the LED drive circuits of each image projector (as shown for the "Output" in FIG. 8A). FIGS. 8C-8D show examples where the display subsystem includes an FPGA, and each output of the FPGA is buffered. FIG. 8D shows an example of a display subsystem with a "master control system" and an offboard FPGA, with a cabled connection between them. The configurations of buffered outputs from the master control system and/or the FPGA shown in FIGS. 8A-8D are non-limiting examples only to illustrate the different options possible. In some embodiments, the outputs from the master control system and/or the FPGA are all the same, and in other cases they can be different from one another.

The example systems shown in FIGS. 6-7 and 8A-8D can be used to control illumination systems in PRPSs with projection or non-projection based illumination systems including those that contain arrays of light emitting diodes, liquid crystal based projection systems, liquid crystal displays (LCDs), liquid crystal on silicon (LCOS) displays, mercury vapor lamp based projection systems, digital light processing (DLP) projectors, discrete lasers, and laser projection systems.

In some embodiments, the image projection system projects an array of sub-images (e.g., 1D or 2D array) that are moved or indexed during the exposure of a layer and/or between the exposures of subsequent layers. A sub-image is an image that is projected from an image projector and makes up a part of a composite image at a given instant in time (i.e., during a print run), where the composite image defines a layer of an object to be printed. When a sub-image from an image projector moves from a first position within the composite image to a second position within the composite image, the patterns (or pixel intensities) within the sub-image can stay the same (e.g., in the case of objects with repeating features), or can change (e.g., to more generally print any object layer shape). In some embodiments, each of the image projectors projects a sub-image onto a portion of the build area, and the image projectors are moved (or separate optical systems such as mirrors are moved, as described below) to move the sub-images. In some embodiments, as the sub-images move, they are projected onto different portions of the build area during the exposure of a layer. The content of the sub-images can change (e.g., the shapes making up the sub-images and/or the average intensity of the sub-images can change) as they are moved to define a different portion of the layer to be printed. However, some embodiments contain repeating structures, and in such cases the sub-images can remain the same as they are moved or indexed. The array of image projectors project sub-images that can cover the entire build area, or a portion of the build area needing exposure for a particular layer. The image projection system containing the array of image projectors can be moved over the print area (e.g., within an open vat of resin or under a membrane and resin tub) to produce larger 3D printed parts than can be made conventionally (i.e., conventional parts must fit within projected areas of non-mobile (i.e., static) imaging systems focused on a pre-determined build area). An advantage of such systems is that fewer image projectors can be used to cover a large build area without compromising pixel resolution (i.e., without enlarging a single projector to cover a larger area, which results in lower resolution projected images). In other words, an advantage of the systems described herein is that large parts can be printed with high spatial resolution. Such systems are capable of creating larger printed parts without sacrificing the spatial resolution of the imaging system, compared to a static image projection system where the image projectors are positioned farther away from the build area, or the magnification of the imaging system is increased, to increase the sub-image size of each projector at the expense of spatial resolution.

In some embodiments, the exposure time of the pixels within a composite image of a given size will be a function of the movement of the projected sub-images, the magnification of the projected sub-images, and/or the total number of sub-images. For example, a single projector is capable of projecting a certain amount of power. If the magnification is increased (i.e., to project a larger sub-image) then the photon flux incident on each pixel will be reduced. In embodiments where the sub-images move in either step-wise or continuous motion, the amount of time the image is projected on a certain pixel before moving to a different location is directly related the amount of light exposure that pixel experiences.

Figure 9A:
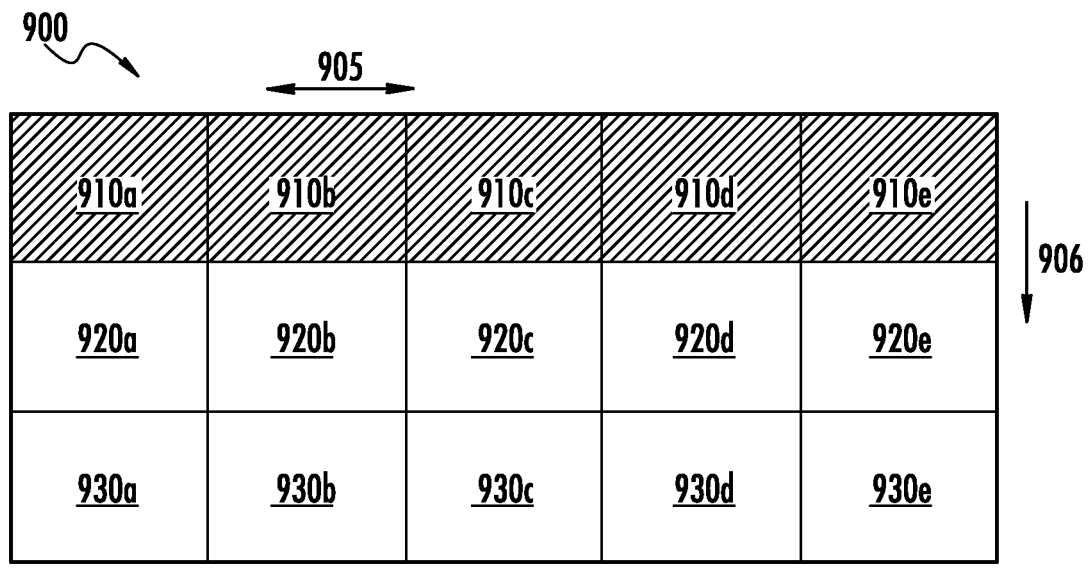
FIGS. 9A and 9B are simplified schematics of composite images composed of moving sub-images, in accordance with some embodiments.
Figure 9B:
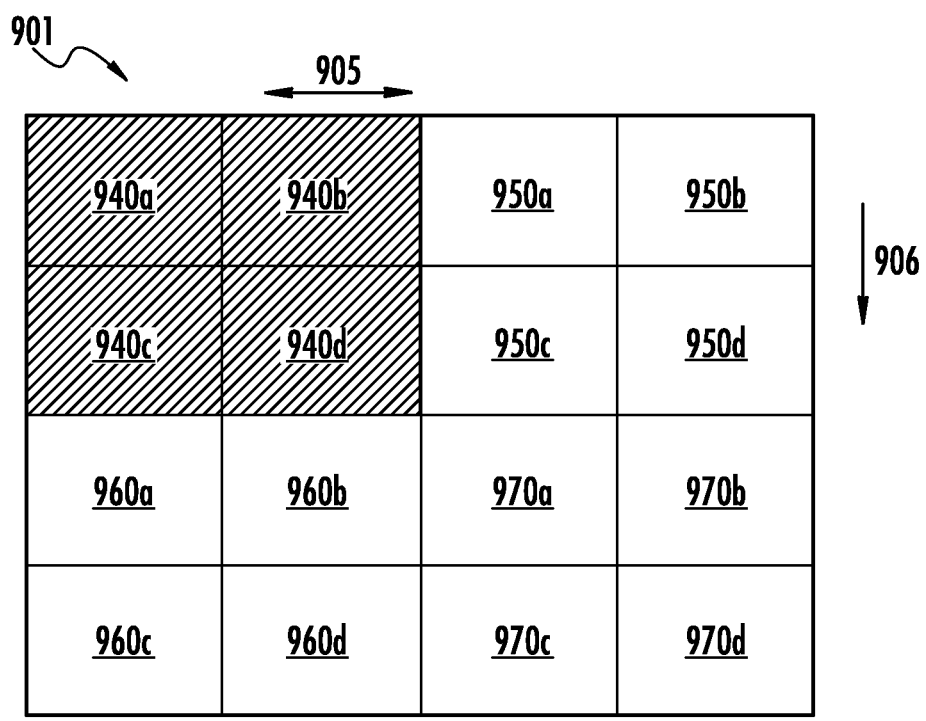

The sub-images being emitted by the projectors can move in one direction or two directions across the build area. FIG. 9A shows a non-limiting example of a composite image 900 made up of 15 sub-images 910a-e, 920a-e and 930a-e arranged in a 3×5 array (with 3 rows and 5 columns). In this example, an array of image projectors projects a 1D array of sub-images 910a-e (i.e., containing a row of sub-images) oriented in a first direction 905 (e.g., covering the whole width of the build area), and then the 1D array of sub-images 910a-e is moved along a second direction 906 perpendicular to the first direction (e.g., along the length of the build area to cover the whole build area) to project sub-images 920a-e corresponding to a second row of sub-images, and sub-images 930a-e corresponding to a third row of sub-images. FIG. 9B shows a second non-limiting example of a composite image 901 made up of 16 sub-images 940a-d, 950a-d, 960a-d and 970a-d arranged in a 4×4 array (with 4 rows and 4 columns). In this example, an array of image projectors projects a 2D array of sub-images 940a-d (i.e., containing a 2×2 array of sub-images) oriented in a first direction 905 and a second direction 906 (e.g., covering part of the width and part of the length of the build area), and then the 2D array of sub-images 940a-d is moved along the first direction 905 to project sub-images 950a-d corresponding to a second 2×2 array of sub-images. In this example, the image projectors then move in the first direction 905 and the second direction 906 to project sub-images 960a-d corresponding to a third 2×2 array of sub-images, and then move in the first direction 905 to project sub-images 970a-d corresponding to a fourth 2×2 array of sub-images. In this example, the 2×2 array of image projectors uses a raster scan to cover the composite image 901.

In other examples, an array of image projectors can project a 2D array of sub-images in an N×M array, where N is the number of sub-images in one direction of the array and M is the number of sub-images in another direction of the array, where N and/or M can be from 1 to 5, or 1 to 10, or 1 to 20, or 1 to 100, or 2, or 5, or 10, or 20, or 100. The array of sub-images can either cover the whole width or length of the build area, or cover a portion of the length or a portion of the width of the build area. In some embodiments, these 2D arrays of sub-images projected from the image projectors can have rows oriented along a first direction and columns oriented along a second direction, and can be moved (i.e., scanned) along either one of the first or second directions (i.e., in a linear scan in one direction), or along both the first and second directions (e.g., in a raster scan a or serpentine scan) within the build area such that the projected sub-images cover the whole build area. Some examples of movements along two directions (e.g., both the width and length of a build area) are raster scans, serpentine scans, or any other type of scan geometry that cover the build area (or portion of the build area needing exposure for a particular layer).

In some embodiments, the number of image projectors (and/or sub-images projected at any particular moment) in the array is from 1 to 5, or 1 to 10, or 1 to 20, or 1 to 100, or 2, or 5, or 10, or 20, or 100 in each dimension. For example, the array size can be 1D, such as 1×1, 1×4, 1×8, 1×20, or 1×100, or 2D and rectangular, such as 2×4, 2×8, 2×20, 4×10, or 4×100, or 2D square, such as 4×4, 5×5, 8×8, 10×10, 30×30, or 100×100. In some embodiments, the array of sub-images can be any one of the sizes listed above and can move (e.g., in synchronization with the image display sub-system).

The examples of PRPSs including moving sub-images described herein can be applied to illumination systems in PRPSs with projection or non-projection based illumination systems including those that contain arrays of light emitting diodes, liquid crystal based projection systems, liquid crystal displays (LCDs), liquid crystal on silicon (LCOS) displays, mercury vapor lamp based projection systems, digital light processing (DLP) projectors, discrete lasers, and laser projection systems.

Figure 10A:
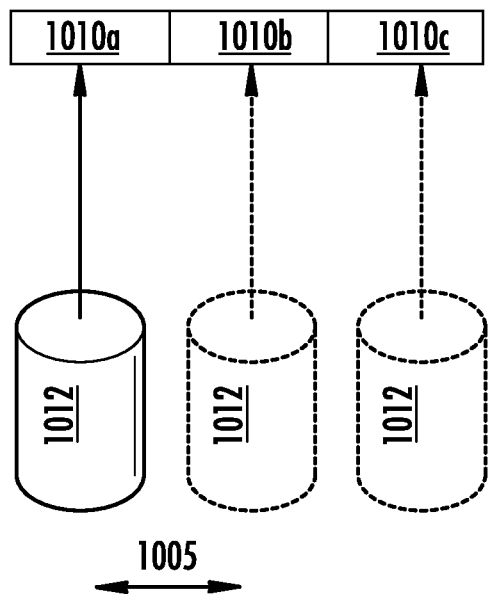
FIGS. 10A-10D are simplified schematics of moving light sources or moving optical systems to form composite images made up of moving sub-images, in accordance with some embodiments.

In some embodiments, the movement of the image projectors includes moving the light source of the image projector (e.g., such as an LED or lamp). In some embodiments, the light source moves by translation (e.g., along a plane that is roughly parallel to the plane of the build area). FIG. 10A shows a non-limiting example of a composite image made up of sub-images 1010a-c, where the light source 1012 moves by translation in the direction 1005. In some embodiments, the light source moves by translation and the direction of translation (e.g., 1005 in FIG. 10A) is approximately parallel to the plane of the build area. In such cases, each image can be calibrated for position, and other corrections, as described further herein.

Figure 10B:
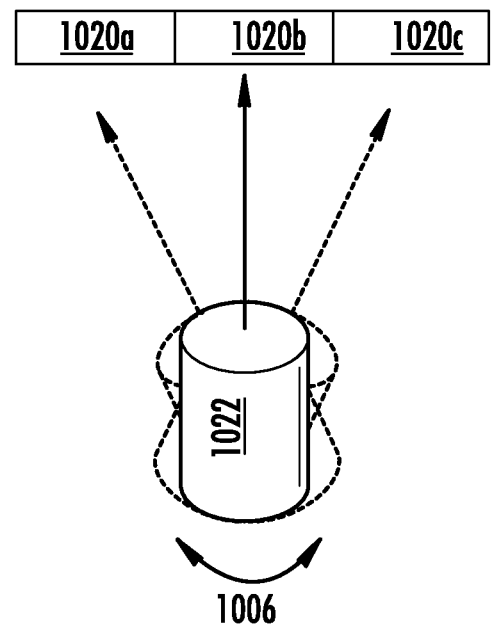

In some embodiments, the light source will move by tilting and/or rotating the light source around one or more axes of rotation. FIG. 10B shows a non-limiting example of a composite image made up of sub-images 1020a-c, where the light source 1022 moves by rotation in the direction 1006. In some embodiments, the direction of rotation (e.g., 1006 in FIG. 10B) has an axis of rotation that is approximately parallel to the plane of the build area. In cases where the image projectors rotate, the position and other corrections such as warp and skew, as described further herein, can be accounted for.

Figure 10C:
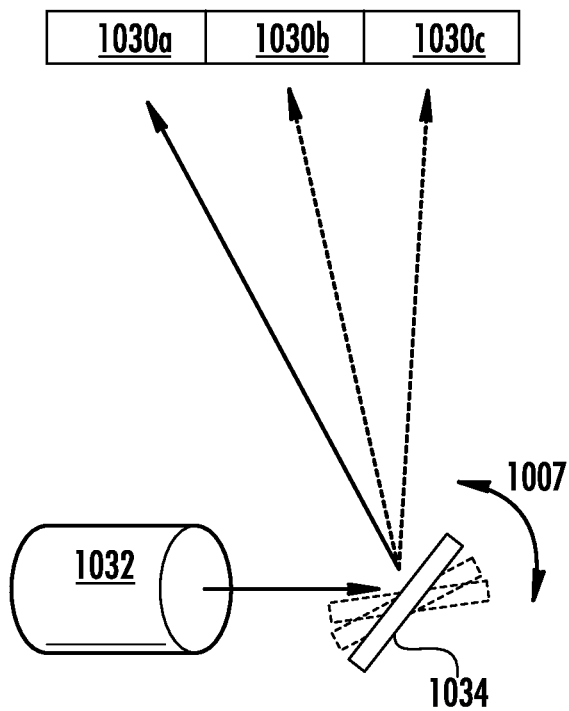
Figure 10D:
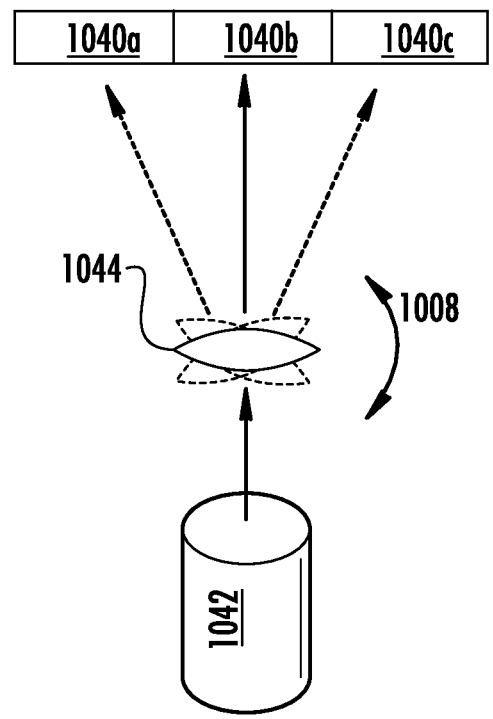

In some embodiments, the light source for the image projectors will be stationary and the projected sub-images will move through the use of moving optical systems (e.g., moving mirrors, or moving lenses). In some embodiments, the optical systems will move by translation (e.g., along a plane that is roughly parallel to the plane of the build area), or by tilting and/or rotating the optical systems around one or more axes of rotation. FIG. 10C shows a non-limiting example of a composite image made up of sub-images 1030a-c, where the light source 1032 is stationary, and a mirror 1034 moves by rotation in the direction 1007 to project the sub-images 1030a-c. Alternatively, FIG. 10D shows a non-limiting example of a composite image made up of sub-images 1040a-c, where the light source 1042 is stationary, and a lens 1044 moves by rotation in the direction 1008 to project the sub-images 1040a-c. In different cases of moving optical systems (e.g., those shown in FIGS. 10C and 10D), each projected image can be calibrated for position, warp and skew, and/or other corrections, as described further herein.

The non-limiting examples in FIGS. 10A-10D contain systems with one moving image projector, or one stationary image projector and one moving optical system (e.g., a mirror or lens). In other embodiments, the PRPSs described herein can contain more than one image projector and or optical system, and the image projectors and/or optical systems move to project a plurality of sub-images onto a build area. In these cases, the multiple image projectors and/or optical systems can all move by translation or rotation. In some embodiments, the PRPS contains sub-systems to enable each image projector and/or sub-image to move independently. In other embodiments, the PRPS contains sub-systems to enable all of the image-projectors and/or sub-images to move as a group. In some embodiments, the image projector(s) and/or optical system(s) can both translate and rotate to project sub-images at different locations within a build area.

In some embodiments, encoders are used to measure the position of a moving component (e.g., image projector or optical system element). For example, magnetic linear encoders can be affixed to image projectors that move by translation and to a stationary chassis of the system, and the position of the image projector with respect to the stationary chassis would be accurately known. Such position feedback can be useful to calibrate the system prior to a print run and/or to monitor the position of the moving component during a print run.

In some embodiments, the movement of an array of image projectors (or optical systems) is synchronized with the display subsystem. For example, the display subsystem can create a print swath corresponding to the motion of each image projector for each layer to be exposed.

FIG. 10E shows a top down view and FIG. 10F shows a perspective view of a non-limiting example of a PRPS 1050 with movable image projectors, in accordance with some embodiments. FIG. 10E shows two image projectors (or image projector assemblies) 1052a-b, that are mounted on movable systems 1054a-b, which are driven by motors 1056*a-b* and allow the image projectors to move in the X and Y directions (as shown by the coordinate system in the figure), and additional moveable systems 1058*a-b*, which allow the image projectors to rotate about the X and/or Y axes (or around an axis other than X or Y). FIG. 10F additionally shows a movable system 1054*c* and a motor 1056*c*, which allow the image projectors to move in the Z direction (as shown in the coordinate system in the figure), a resin tub 1062 and a build platform 1064 than can be moved (in the Z direction) into and out of a resin pool contained within the resin tub 1062. The additional moveable systems 1058*a-b* are not shown in FIG. 10F, but can be included in some embodiments.

Continuing with FIGS. 10E and 10F, in some embodiments, the image projectors 1052*a-b* contain light emitting diodes, liquid crystal based projection systems, liquid crystal displays (LCDs), liquid crystal on silicon (LCOS) displays, mercury vapor lamp based projection systems, digital light processing (DLP) projectors, discrete lasers, or laser projection systems. The example PRPS 1050 in FIGS. 10E and 10F show two image projectors 1052*a-b*, however, similar systems can be used to move more than 2 image projectors, such as from 2 to 20 image projectors. The image projectors (e.g., 1052*a-b* in FIGS. 10E and 10F) can be mounted using any mechanism, for example, using a mechanism that securely mounts the projector to the moveable systems (e.g., 1054*a-c* and/or 1058*a-b* in FIGS. 10E and 10F), and that is capable of maintaining a static position of each projector (e.g., during an exposure, in accordance with some methods).

The movable systems 1054*a-c* can include belts, chains, guide rails, lead screw drives, or other types of linear drive mechanisms. The motors 1056*a-c* can include stepper motors, DC brushed or brushless servo-based motors, or a combination thereof, or other types of movement systems capable of working with the moveable systems 1054*a-c* to move the image projectors. In some embodiments, position feedback is used to accurately move the image projectors a certain distance and/or to a certain location in space. Position feedback can be obtained optically, electrically, magnetically, or using a combination thereof. Some non-limiting examples of position feedback systems are those that include optical encoders, magnetic encoders, and optical array position sensors. The moveable systems 1054*a-c* can be in locations other than those shown in FIGS. 10E and 10F. For example, the moveable systems 1054*a-c* need not be on the side of the mounted image projectors; they can be positioned in the middle between the mounted image projectors 1052*a-b*. In some embodiments, there is more than one motorized rail system in a given axis.

FIGS. 10E and 10F show one example of a PRPS with multiple image projectors that can move along multiple axes. In some embodiments, similar movement systems can be used in PRPSs that project from the top-down, rather than bottom up, as shown in FIGS. 10E and 10F. The image projectors can be independently moveable or their movement can be coupled together (e.g., using the same movement system to move multiple image projectors), in different embodiments.

The movement provided by the mechanisms shown in FIGS. 10E and 10F enable each image projector 1052*a-b* to translate in the X and Y directions as depicted in FIG. 10A, and the additional moveable systems 1058*a-b* enable each image projector 1052*a-b* to rotate as depicted in FIG. 10B. In other embodiments, the image projectors are stationary, and a mirror or lens system can translate and/or rotate using similar mechanisms shown in FIGS. 10E and 10F to enable the systems depicted in FIGS. 10C and 10D.

Two categories of moving systems and methods will now be described, one using a step-expose-step configuration and one using a continuous motion configuration. In both of these types of systems, the array of sub-images can be 1D or 2D, and can be moved (i.e., scanned) in one direction or more than one direction to cover the portion of the build area needed for a given layer exposure.

Figure 11:
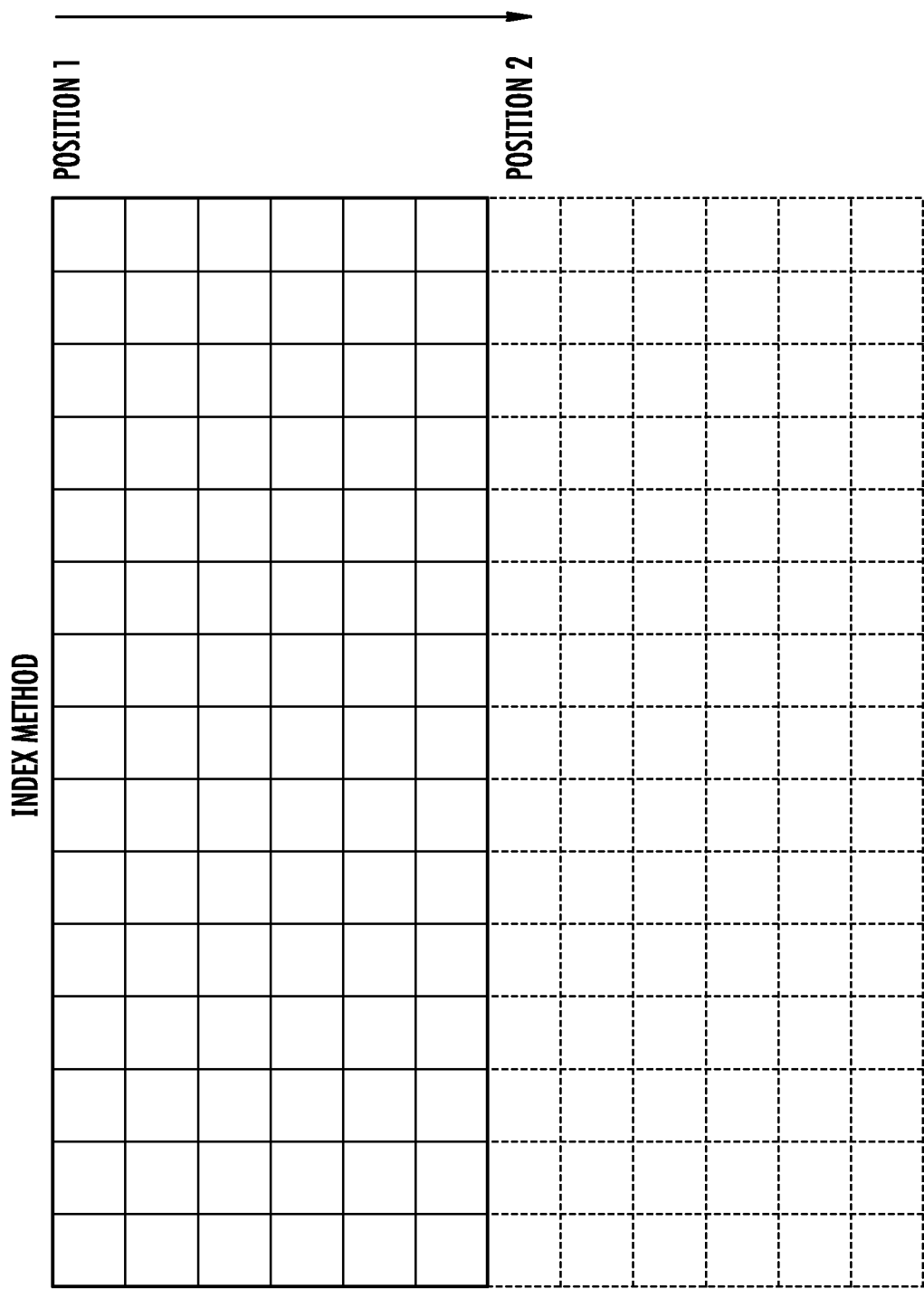
FIGS. 11-13 are simplified schematics of moving sub-images, in accordance with some embodiments.

In some embodiments of image projection systems and methods with arrays of moving image projectors projecting moving arrays of sub-images, step-expose-step systems and methods are used. For example, an array of image projectors can be moved to a first position and then the sub-images of each image projector can be displayed. Then the array can be moved to a second position and a second set of sub-images can be displayed. By repeating this step-expose-step process, the entire build area can be exposed in a piece-wise fashion. The examples shown in FIGS. 10A-10D illustrate different types of movement that can be used to form a composite image from sub-images that are projected at different locations by moving an image projector or optical system using a step-expose-step method. FIG. 11 shows one example of a step-expose-step system and method (i.e., an index method), where a 15×5 pixel sub-image (i.e., each box in FIG. 11 depicts a pixel within a sub-image) of an image projector (e.g., within an array of image projectors) is used to project a 15×5 pixel sub-image at "position 1" (solid lines) within the build area, and then the array of image projectors is moved and a 15×5 pixel sub-image is moved and projected onto "position 2" (dashed lines) within the build area. The sub-images in position 1 and position 2 in this example do not overlap, however, in other embodiments of step-expose-step methods adjacent sub-images will overlap with one another.

Figure 12:
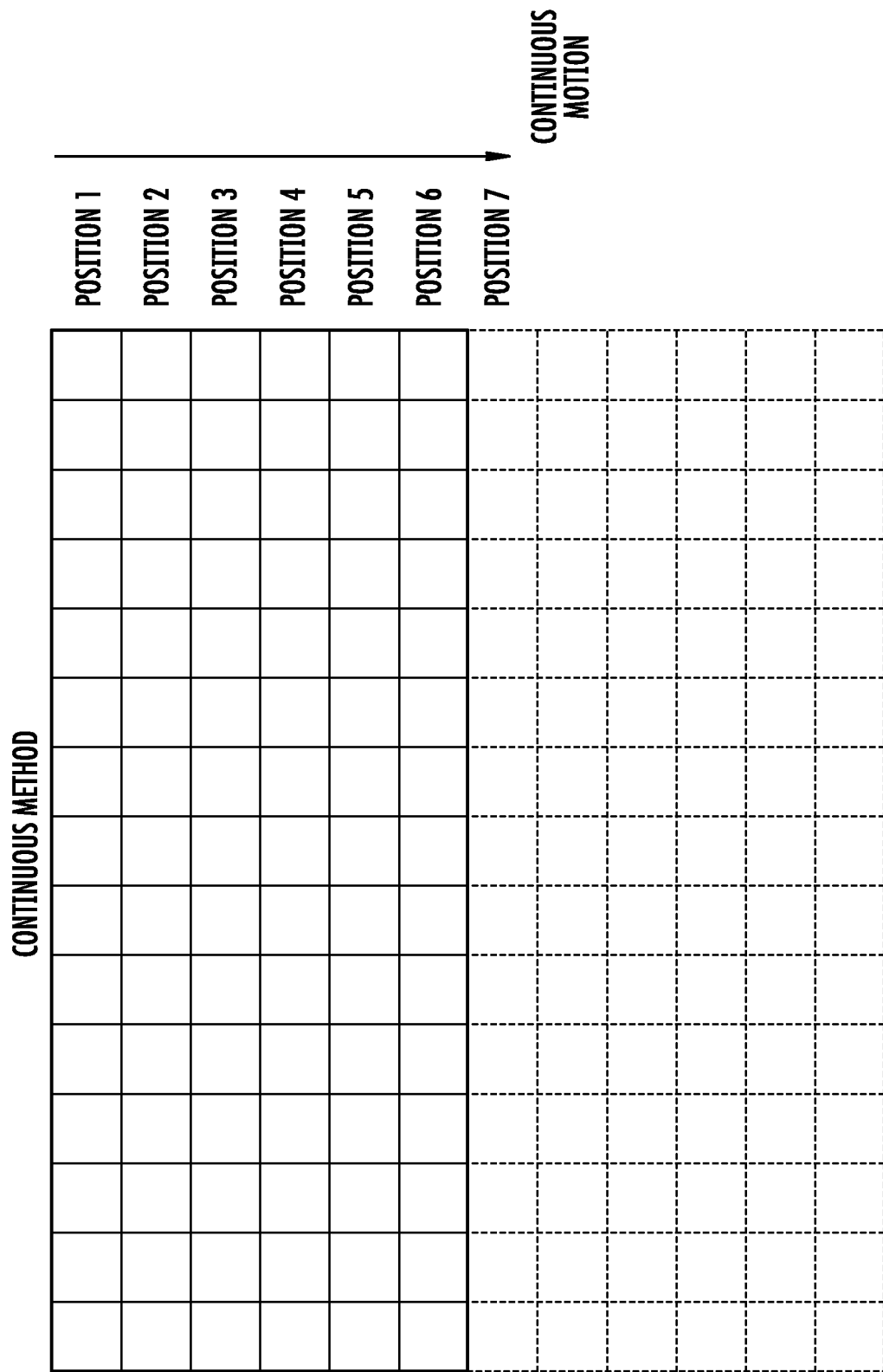

In some embodiments of image projection systems and methods with moving arrays of image projectors projecting moving arrays of sub-images, continuous motion is used. For example, an array of image projectors can be continuously moved across a build area, and the display sub-system can synchronize the projected sub-images with the velocity of the array movement. In this manner the array can move at a constant velocity (in one or more than one direction, e.g., in a linear scan, a raster scan, a serpentine scan, etc.) and the image content is continuously updated to create a moving "exposure aperture" of the full layer image. FIG. 12 shows one example of a continuous movement system and method, where a sub-image of an image projector within an array is used to project a sub-image over "position 1" through "position 7" within the build area (each box in the figure depicts a pixel within a sub-image), and the array is continuously moved along the build area in the direction of "continuous motion". In other words, the trailing edge of the sub-image shown in FIG. 12 will start at "position 1", and then continuously move such that the trailing edge of the sub-image will be located at "position 2", then at "position 3", and so on until the layer exposure is complete. Once the sub-image reaches "position 7" in this example, the trailing edge will be past the point of the leading edge when the image was at "position 1". In such embodiments, at any single instant in time a portion of the composite image (i.e., a sub-image) is projected by each of the image projectors in the array. However, in these embodiments, since the array of sub-images is continuously moving across the build area, the display subsystem will control each image projector to project a "movie" (or animation) of sub-images in which each sub-image effectively moves across the field of view of each of the image projectors in real time (e.g., synchronized with the movement of the array of image projectors). In such embodiments, the exposure time of each pixel is related to the scan speed (i.e., the speed at which the sub-image moves across the build area). In these embodiments, the exposure of a given pixel is also related to the size of the exposure region in the direction of motion of the sub-image. In general, the total energy transfer to a theoretical "point" of resin is related to power times time, and in embodiments with continuously moving sub-images the time factor is comprised of the distance scanned divided by the scan velocity.

In some embodiments, the array of image projectors and sub-images is moved to overcome defects in the image projectors and sub-images (e.g., dead pixels, lens artifacts, etc.) by shifting the sub-images slightly to regions or areas having good pixels or with the most optimal optical properties. In such embodiments, the movement is synchronized with the display subsystem to project the appropriate sub-images across the whole build area (or portion of the build area needing exposure for a particular layer) to create the pattern needed for the part being printed.

Figure 13:
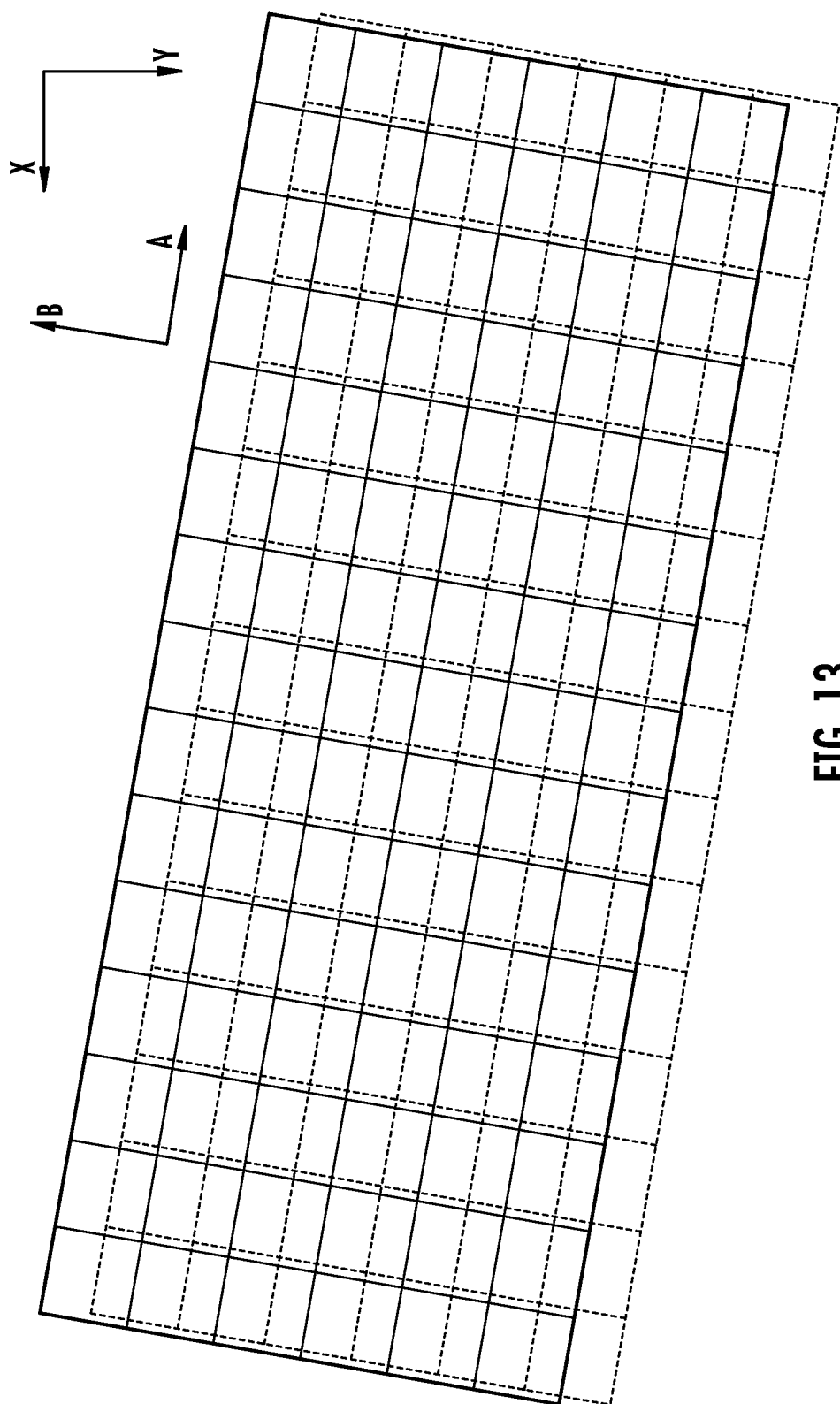

In some embodiments, a moving sub-image (e.g., as described above) is tilted with respect to a scan direction to provide better interpolated resolution in the direction perpendicular to the scan direction. For example, FIG. 13 depicts two instances (in time) of a continuously moving sub-image projected from a continuously moving image projector (or optical system), where the orientation of the sub-image is tilted (or rotated) with respect to the scan direction. The scan direction is in the "Y" direction in the figure, and the first sub-image is shown as solid lines that define the pixels within the sub-image. The dotted lines show a second sub-image after the sub-image moves in the "Y" direction. For example, a 2D array of sub-images can be oriented such that the sub-images are arranged in rows oriented along a first direction and columns oriented along a second direction, and the movement of the image projectors is such that the sub-images move in a third direction that is different from both the first and second directions. FIG. 13 shows an example of a tilted sub-image with rows and columns oriented along two directions "A" and "B", that is moving in a third direction "Y". In this example, the tilted sub-image provides higher resolution in the "X" direction (the direction perpendicular to the scan direction "Y"). The effective resolution in the "Y" direction is also increased due to the tilting, and in some embodiments, is also impacted by the movement parameters of the image projector. For example, in the case of continuous sub-image scanning, the effective resolution in the direction of movement can be governed by the quality of the motion control and movement synchronization with the display sub-system. In some cases, the motion control quality is high enough to provide sub-pixel resolution in the scan direction (e.g., in terms of movement and/or positioning accuracy). In some embodiments, tilting enables the system to have higher granularity in one or more directions of the build area by enabling interpolation between pixels (e.g., within the image display subsystem). In contrast, a non-tilted imaging system would result in granularity defined by the image pixel size in the direction perpendicular to the scan direction.

In some embodiments, an image projection system contains an array of image projectors projecting an array of sub-images, and the orientation of each of the sub-images in the array is tilted with respect to a scan direction to provide better interpolated resolution in the direction perpendicular to the scan direction as described above.

There are a number of devices that can serve as the apparatus for moving the array of image projectors within the image projection system. Some examples include, but are not limited to, motors, pneumatics, gravity-based systems, and linear actuators. The imaging systems described above are not limited to projection DLP based systems. Some examples of imaging systems that can utilize an array of image projectors as described herein include, but are not limited to, DLP based systems, lamp-based projection systems, LCD based systems, and laser-based imaging systems.

In some embodiments, more than one part (or object) can be printed simultaneously. This can be advantageous to more optimally utilize the build area and increase part production rate. In some embodiments, an additive manufacturing system contains an array of image projectors, each of which projects a sub-image onto a build area, and more than one part is printed within the build area during a single print run. For example, an additive manufacturing system can contain an array of 3×3 image projectors, projecting 9 total sub-images onto a build area, and 9 individual parts (i.e., parts that are not physically connected) can be printed within the build area during a single print run. In that case, one image projector projects a set of sub-images, where each sub-image exposes one layer for a single part. In this example, since each individual object is created using a single image projector in the array, the stitching together of the sub-images from the different image projectors in the array is less complex (e.g., edge blending would not be required), or is not required at all.

In some embodiments, more than one object is printed simultaneously and each individual object is printed using a single image projector in the array, as described above. In other embodiments, more than one object is printed simultaneously and more than one image projector is used to print a single object. For example, an additive manufacturing system can contain an array of 2×4 image projectors, projecting 8 total sub-images onto a build area, and 2 individual parts (i.e., parts that are not physically connected) can be printed within the build area during a single print run. In this example, each individual part can be printed using 4 of the image projectors. In this example, each individual object is created using more than one image projector in the array, and the stitching together of the sub-images is somewhat more complex (e.g., edge blending for some of the sub-images would still be required).

In some embodiments, the individual objects (i.e., one or more objects) that are printed simultaneously are approximately identical, while in other embodiments, the individual objects that are printed simultaneously are different from one another. In some embodiments, more than one object is printed simultaneously and the image projectors and/or optical systems in the additive manufacturing system are stationary or are moving, as described further herein.

In some embodiments, the PRPSs described herein further include a calibration fixture containing a plurality of sets of light sensors. In some embodiments, each set of light sensors is associated with one or more sub-images, and the signals from the sets of sensors are fed into one or more microcontrollers to process the information from the sensors and provide the information in a feedback loop to the PRPS to make adjustments to the sub-images (e.g., alignment, position, intensity, warp, edge blending and/or any of the image corrections or adjustments described herein). In some embodiments, the light sensors in each set are placed such that they coincide with positions at or near the corners of the one or more sub-images.

In some embodiments, the calibration fixture can be inserted into the PRPS to capture the illumination from the image projection system at any time (e.g., between print runs, during print runs, once to initially set up the system (e.g., at the PRPS production factory), or periodically for maintenance. In some embodiments, the light sensors used in the calibration fixtures have narrow fields of view, to improve the alignment accuracy provided by the calibration fixture.

Some non-liming examples of some embodiments of the systems and methods described herein follow.

Example 1: Irradiance Mask

In this example, an image projector outputs across its projected area a solid white image where, when measured (e.g., by a calibration fixture described herein), the pixels in the top left corner are 5% less bright (i.e., 5% lower irradiance) than elsewhere in the field of view. An irradiance mask is applied that acts as a "burn filter" (i.e., a filter that decreases or increases the irradiance in a pattern, locally, or uniformly across an image). The irradiance mask, when applied to the solid white image, brings the 100% bright pixels elsewhere in the image down to 95% in order to create a uniform irradiance across the whole image.

Example 2: Reactivity Variations

In this example, a gamma correction is used to remap 0-255 pixel values to the addressable range of reactivity for curing a resin. This maximizes the number of gray-scale levels available which is beneficial to minimize aliasing artifacts from curved or smooth surfaces being produced on an inherently square-pixel based projection system. Furthermore, different resins used in PRPSs generally have different reactivity curves. Gamma correction filters, such as the one described in this example, can be used for each different resin to remove variations and improve part-to-part consistency, which is beneficial to enable PRPSs to operate effectively in industrial manufacturing settings.

Figure 14:
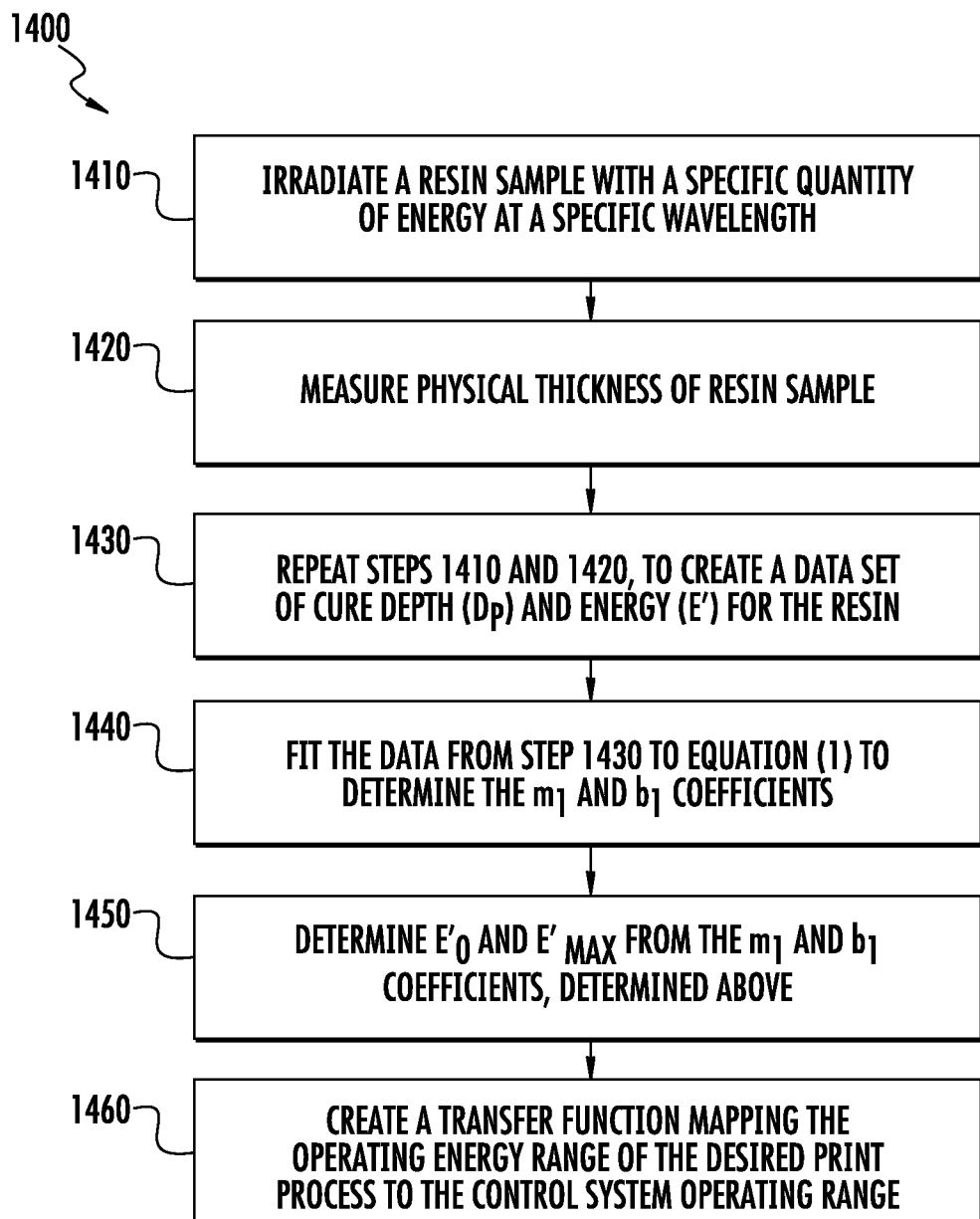
FIG. 14 is a flowchart of a method describing gamma correction, in accordance with some embodiments.

The relationship between the cure depth and the energy per unit area for a non-limiting example resin can be determined using the method 1400 shown in FIG. 14. The method 1400 shown in FIG. 14 describes how the relationship shown in FIGS. 5A-5B and equations (1)-(7) can be determined in accordance with some embodiments.

In step 1410, a sample of resin is placed in a PRPS and the PRPS is commanded to irradiate the resin sample with a specific quantity of energy at a specific wavelength. In step 1420, the sample is then removed from the printer and the physical thickness of cured resin, resulting from step 1410, is measured. Any measurement technique that provides sufficient accuracy may be used to measure the thickness of the cured resin in step 1420. One non-limiting example of a resin thickness measurement method includes the use a micrometer (e.g., mounted on a Starrett stand with granite surface) for making comparative measurements. In such a method, the thickness of a cured resin sample can be measured by lowering a plunger tip of the micrometer under a specified load (or contact force) and allowing the tip to settle for a specific amount of time before taking a thickness reading. Another non-limiting example of a resin thickness measurement method includes the use of a laser measurement device where the laser wavelength is outside the resin curing wavelength window. The result of steps 1410 and 1420 is a single data point of cure depth ($D_p$) and energy (E'). In step 1430, steps 1410 and 1420 are repeated over a desired range of energy doses to create a data set of cure depth ($D_p$) and energy (E').

In step 1440, the data set determined in step 1430 is fit to the relationship of equation (1) to determine the coefficients $m_1$ and $b_1$. For the resin in this example, $m_1$ can equal 40.0 $\mu m/(mJ/cm^2)$, and $b_1$ can equal $-105.0$ $\mu m$ (note that the b coefficient in this case is negative, indicating that the y-intercept of the line in FIG. 5A is below the x-axis). The relationship of the actual data to the derived data set can be tested using a least squares regression analysis to compute the correlation coefficient. In some embodiments, the target for the $R^2$ value is 0.95 or better. Having determined the coefficients for the resin in equation (1), a suitable working relationship is available for use in the PRPS for the specific resin tested at the specific wavelength of the energy utilized.

In step 1450, the two specific relationships for $E'_0$ and $E'_{max}$ in equations (4) and (5) are derived from equation (1) as described above, using the $m_1$ and $b_1$ coefficients determined in step 1440. $E'_0$ is a fundamental property of the resin, and $E'_{max}$ is affected by the resin curing behavior and the specifics of the desired print process. For the resin in this example with the $m_1$ and $b_1$ coefficients described above, $E'_0$ is 13.8 $mJ/cm^2$. In this non-limiting example, the desired cure thickness is 250 $\mu m$, and therefore the resulting value for $E'_{max}$ is 7150 $mJ/cm^2$.

The next step 1460 in the gamma adjustment process 1400 is to create a transfer function mapping the operating energy range of the desired print process to the control system operating range. Given a hypothetical input energy quantization range of 0 to 255 to be distributed over a logarithmic energy distribution ranging from $E'_0$ to $E'_{max}$, the resulting energy function is given in equation (6), where $m_2=(255/E'_{max})$ and $b_2=0$.

Figure 15A:
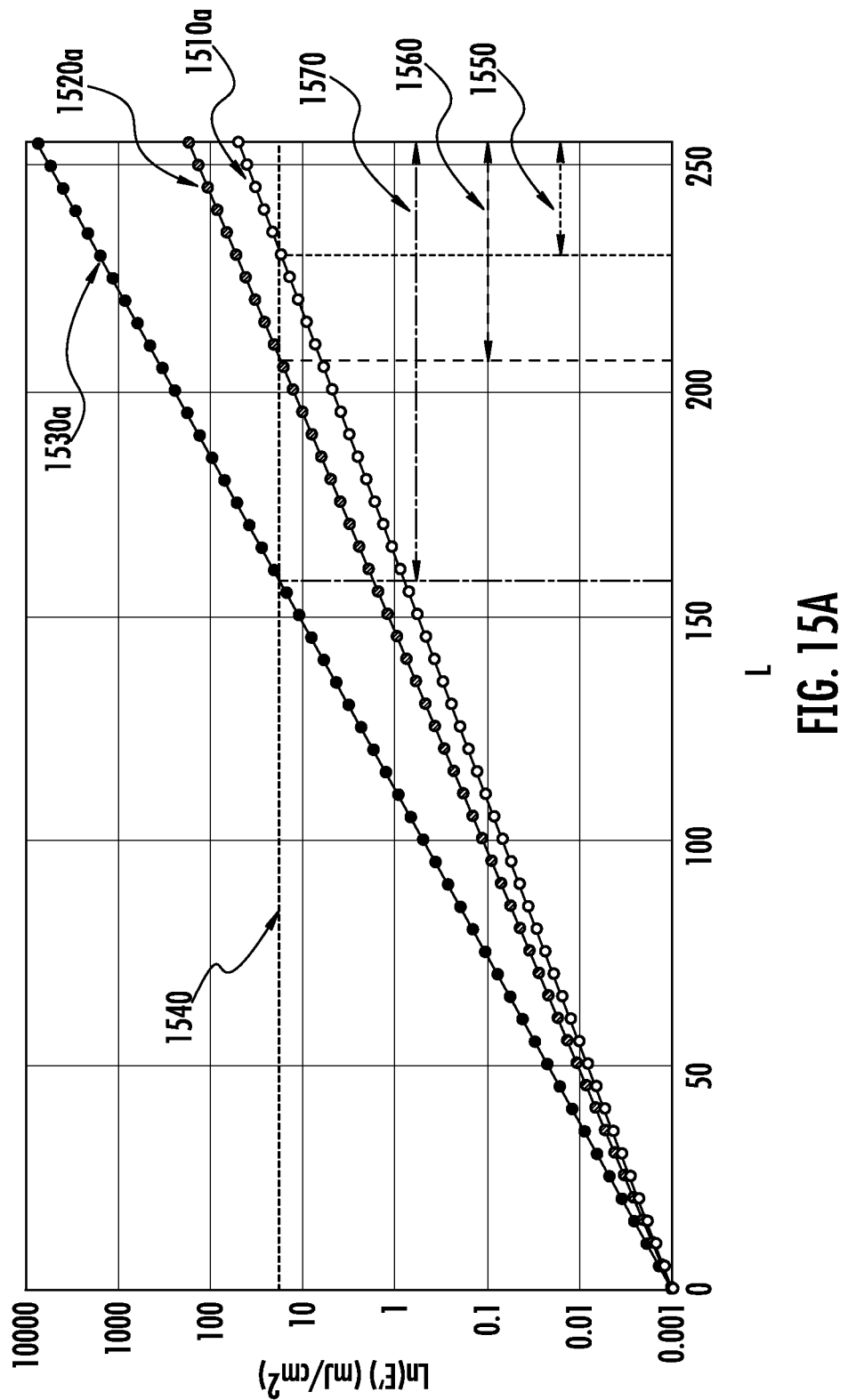
FIG. 15A is a plot showing the relationship between energy per unit area (E') and pixel intensity (L) for an example resin before any gamma correction is applied, in accordance with some embodiments.
Figure 15B:
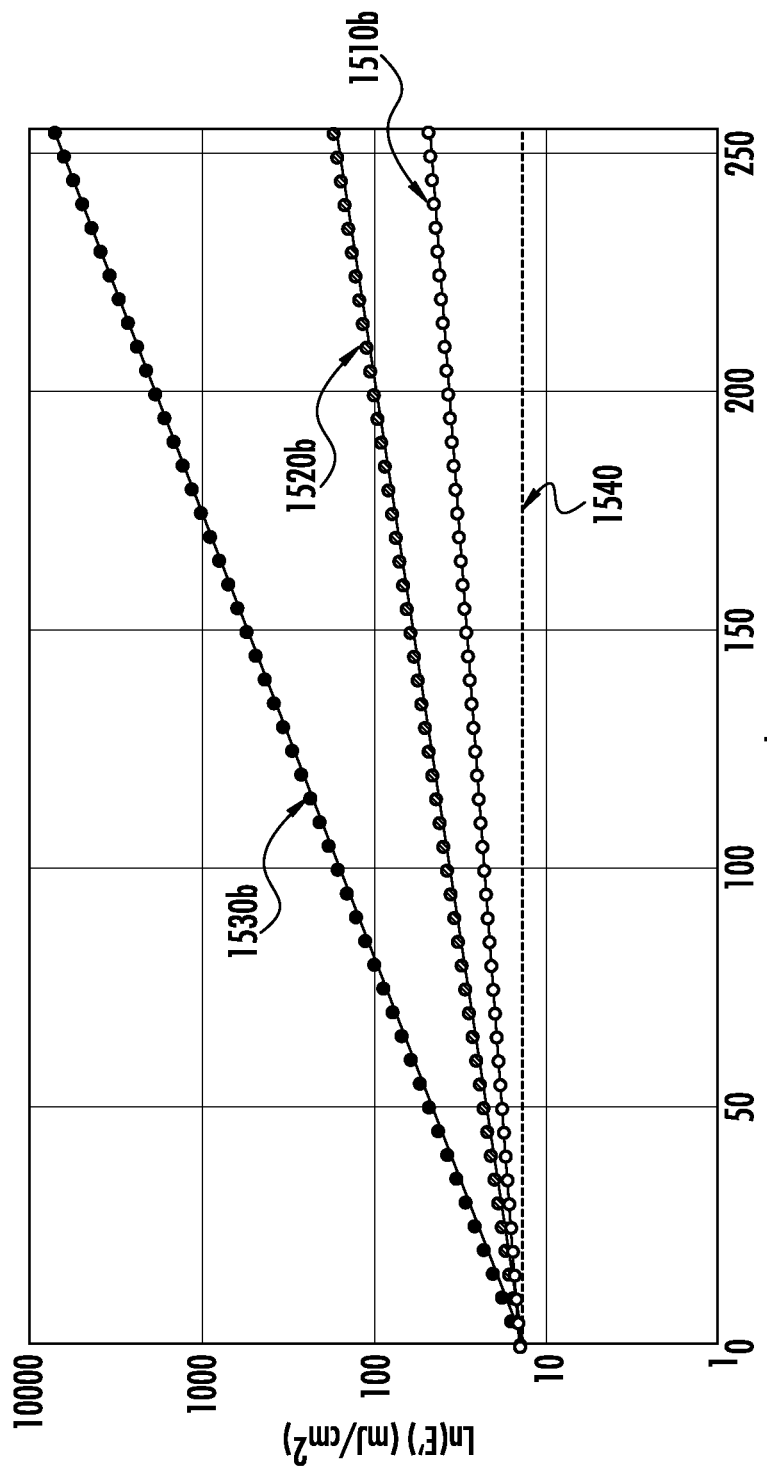
FIG. 15B is a plot showing the relationship between E' and L for an example resin after gamma correction is applied, in accordance with some embodiments.

FIGS. 15A and 15B show relationships between the energy per unit area (E') and the pixel intensity (L). The plots in FIGS. 15A and 15B have ln(E') in units of $mJ/cm^2$ on the y-axes and L (with ranges from 0 to 255) on the x-axes. Three curves are shown in each plot. In this example, curves 1510a-b correspond to a layer thickness (i.e., the thickness of each layer in the printed part) of 50 microns, curves 1520a-b correspond to a layer thickness of 100 microns, and curves 1530a-b correspond to a layer thickness of 250 microns. Correspondingly, the curves show that thicker layers require more energy for a particular input value L. The minimum ln(E') 1540 required to produce a cure depth $D_p=0$ is also shown in the figures.

FIG. 15A shows the relationship between E' and L before any gamma correction is applied. The dynamic ranges (i.e., the range of pixel intensities that can be achieved by the resin) before gamma correction are limited, and are shown by ranges 1550, 1560, and 1570, for 50 micron, 100 micron and 250 micron thick layers respectively. Before gamma correction, therefore, the full range of pixel intensities (e.g., 0-255 in this example) cannot be achieved. In other words, the fidelity (or granularity) of pixel intensities L and/or energy densities E' is limited. Furthermore, the thinner layers require less energy to reach a maximum required cure depth, $D_{p,max}$, but the minimum ln(E') 1540 required to produce a cure depth $D_p=0$ is similar for thicker and thinner layers. As a result, the dynamic range for thinner layers is generally even smaller than that of thicker layers.

FIG. 15B shows the relationship between E' and L after gamma correction is applied, as described above. The minimum energy per unit area ln(E') 1540 required to produce a minimum cure depth, $D_p=0$, now corresponds to L=0. Additionally, the energy required to achieve a maximum cure depth, $D_{p,max}$, corresponds to L=255. In other words, the above gamma correction methods enable the full dynamic range of pixel values to be achieved (and/or, a higher fidelity of pixel values to be achieved). FIG. 15B also shows that the full dynamic range is achievable for all layer thicknesses in this example.

In some cases, a PRPS contains an illumination source, wherein the output energy power from the illumination source is a function of a power input to the illumination source. It is therefore useful to determine the exposure time ($T_{exp}$) required to produce a given energy per unit area (E') for a given input power to the illumination source. For example, the irradiance (Ir) in equations (2) and (3) can be a function of the input power (pwm) to the illumination source, which can be defined by the following expression $$Ir = C_2*(pwm)^2 + C_1*pwm + C_0 \qquad (10)$$

where $C_0$, $C_1$ and $C_2$ are constants. Equation 10 can then be substituted into equation (3) to determine the exposure time ($T_{exp}$) needed to produce a particular energy per unit area (E') for a given input power (pwm) to the illumination source.

Reference has been made in detail to embodiments of the disclosed invention, one or more examples of which have been illustrated in the accompanying figures. Each example has been provided by way of explanation of the present technology, not as a limitation of the present technology. In fact, while the specification has been described in detail with respect to specific embodiments of the invention, it will be appreciated that those skilled in the art, upon attaining an understanding of the foregoing, may readily conceive of alterations to, variations of, and equivalents to these embodiments. For instance, features illustrated or described as part of one embodiment may be used with another embodiment to yield a still further embodiment. Thus, it is intended that the present subject matter covers all such modifications and variations within the scope of the appended claims and their equivalents. These and other modifications and variations to the present invention may be practiced by those of ordinary skill in the art, without departing from the scope of the present invention, which is more particularly set forth in the appended claims. Furthermore, those of ordinary skill in the art will appreciate that the foregoing description is by way of example only, and is not intended to limit the invention.

What is claimed is:

1. A method comprising:
   a. providing an additive manufacturing system, comprising:
   an image projection system comprising a plurality of image projectors; and
   an image display subsystem;
   b. projecting a composite image onto a build area within a resin pool using the image projection system, wherein:
   the image projection system is controlled by the image display subsystem;
   the composite image comprises a plurality of sub-images arranged in an array;
   two or more adjacent sub-images in the array overlap at two or more sub-image edges; and
   each sub-image is projected onto a portion of the build area using one of the plurality of image projectors; and
   c. adjusting properties and aligning a position of each sub-image in the array using a set of filters comprising:
   an irradiance mask that normalizes irradiance;
   a gamma adjustment mask that adjusts sub-image energy based on a reactivity of resin in the resin pool;
   a warp correction filter that provides geometric correction; and
   an edge blending bar at one or more sub-image edges.

2. The method of claim 1, wherein the image display subsystem controls the image projection system and each of the image projectors using digital light processing.

3. The method of claim 1, wherein the irradiance mask additionally adjusts the energy across the build area to compensate for non-uniformities in optics of the plurality of image projectors.

4. The method of claim 1, wherein the gamma adjustment mask comprises a logarithmic relationship between a cure depth of the resin and energy per unit area in the build area.

5. The method of claim 1, wherein the resin is selected from the group consisting of acrylates, epoxies, methacrylates, urethanes, silicone, vinyls, and combinations thereof.

6. The method of claim 1, wherein the edge blending bar comprises a blending distance and a function selected from the group consisting of: linear, sigmoid and geometric.

7. The method of claim 1, wherein the edge blending bar adjusts the one or more sub-image edges based on at least one layer boundary location within an object being manufactured.

8. The method of claim 1, further comprising a system controller that synchronizes exposure control of the plurality of image projectors with each other.

9. The method of claim 1, wherein the projecting the composite image further comprises moving the plurality of sub-images during an exposure of a layer of an object being manufactured.

10. The method of claim 9, wherein the movement of the sub-images is either a step-expose-step type movement or a continuous movement.

11. The method of claim 9, wherein:
    the plurality of sub-images comprises a 1D array of sub-images oriented in a first direction; and
    the movement of the sub-images is in a second direction perpendicular to the first direction.

12. The method of claim 9, wherein:
    the plurality of sub-images comprises a 2D array of sub-images with rows oriented along a first direction and columns oriented along a second direction; and
    the movement of the sub-images is in either one of the first or second directions, or both the first and second directions.

13. The method of claim 9, wherein:
    the plurality of sub-images arranged in the array comprises one or more rows oriented along a first direction and one or more columns oriented along a second direction; and
    the movement of the sub-images is in a third direction that is different from both the first and second directions.

14. The method of claim 1, wherein the adjusting properties and aligning the position of each sub-image in the array further comprises applying the irradiance mask to each sub-image such that the composite image has a uniform irradiance range across the composite image.

15. The method of claim 1, wherein the adjusting properties and aligning the position of each sub-image in the array further comprises applying the irradiance mask to each sub-image to normalize irradiance non-uniformities within the image projection system arising from a projector-based spatial energy non-uniformity.

* * * * *